US010871567B2

(12) United States Patent
Embry et al.

(10) Patent No.: US 10,871,567 B2
(45) Date of Patent: Dec. 22, 2020

(54) UNDERWATER OPTICAL POSITIONING SYSTEMS AND METHODS

(71) Applicant: 3D at Depth, Inc., Longmont, CO (US)

(72) Inventors: Carl W. Embry, Boulder, CO (US);
Neil Manning, Longmont, CO (US);
Derek D. Pierce, Houston, TX (US);
Mark Hardy, Castle Rock, CO (US)

(73) Assignee: 3D AT DEPTH, INC., Longmont, CO (US)

( * ) Notice: Subject to any disclaimer, the term of this patent is extended or adjusted under 35 U.S.C. 154(b) by 153 days.

(21) Appl. No.: 16/031,812

(22) Filed: Jul. 10, 2018

(65) Prior Publication Data

US 2019/0011565 A1    Jan. 10, 2019

Related U.S. Application Data

(60) Provisional application No. 62/530,747, filed on Jul. 10, 2017.

(51) Int. Cl.
*G01S 15/87* (2006.01)
*G01S 17/88* (2006.01)
(Continued)

(52) U.S. Cl.
CPC ............ *G01S 15/874* (2013.01); *B63G 8/001* (2013.01); *B63G 8/38* (2013.01); *G01C 13/00* (2013.01);
(Continued)

(58) Field of Classification Search
CPC ........ G01S 15/874; G01S 15/86; G01S 15/74; G01S 15/87; G01S 17/89; G01S 17/93;
(Continued)

(56) References Cited

U.S. PATENT DOCUMENTS

| 4,123,160 A | 10/1978 | Caputo et al. |
| 4,948,258 A * | 8/1990 | Caimi ................ G01B 11/2441 |
| | | 356/3.13 |

(Continued)

FOREIGN PATENT DOCUMENTS

| CN | 105716591 | 6/2016 |
| WO | WO 2016/068715 | 5/2016 |

(Continued)

OTHER PUBLICATIONS

U.S. Appl. No. 16/599,005, filed Sep. 3, 2019, Embry et al.
(Continued)

*Primary Examiner* — Dale W Hilgendorf
*Assistant Examiner* — Alexander C. Bost
(74) *Attorney, Agent, or Firm* — Sheridan Ross P.C.

(57) ABSTRACT

Systems and methods for positioning objects in underwater environments are provided. The geolocation of a target for an object is determined, and a light source provided as part of a positioning system is operated to project a visible target at that location. The determination of the target location relative to the positioning system can include determining a location of the positioning system using information obtained from a laser system included in the positioning system. The light source used to project the visible target can be the same as a light source included in the laser system. A location of an object relative to the target location can be tracked by the laser system as the object is being moved towards the target location. The described methods and systems utilize one or more non-touch subsea optical systems, including but not limited to laser systems, for underwater infrastructure installation, measurements and monitoring.

33 Claims, 14 Drawing Sheets

(51) Int. Cl.

| | | |
|---|---|---|
| *G01S 17/42* | (2006.01) | |
| *G01S 15/74* | (2006.01) | |
| *G01C 13/00* | (2006.01) | |
| *G01S 15/86* | (2020.01) | |
| *G01S 17/86* | (2020.01) | |
| *B63G 8/00* | (2006.01) | |
| *B63G 8/38* | (2006.01) | |
| *G01C 21/20* | (2006.01) | |
| *G01S 17/89* | (2020.01) | |
| *G01S 17/93* | (2020.01) | |
| *G01S 17/74* | (2006.01) | |

(52) U.S. Cl.
CPC .............. *G01C 21/20* (2013.01); *G01S 15/74* (2013.01); *G01S 15/86* (2020.01); *G01S 15/87* (2013.01); *G01S 17/42* (2013.01); *G01S 17/86* (2020.01); *G01S 17/88* (2013.01); *G01S 17/89* (2013.01); *G01S 17/93* (2013.01); *B63G 2008/005* (2013.01); *G01S 17/74* (2013.01)

(58) Field of Classification Search
CPC .......... G01S 17/88; G01S 17/74; G01S 17/86; G01S 17/42; B63G 8/001; B63G 8/38; B63G 2008/005; G01C 21/20; G01C 13/00
See application file for complete search history.

(56) References Cited

U.S. PATENT DOCUMENTS

| | | | |
|---|---|---|---|
| 5,311,272 A | 5/1994 | Daniels et al. | |
| 5,343,284 A | 8/1994 | Keeler et al. | |
| 6,672,131 B1 | 1/2004 | Aldal et al. | |
| 6,700,835 B1* | 3/2004 | Ward | G01B 5/004 367/131 |
| 6,836,285 B1 | 12/2004 | Lubard et al. | |
| 7,139,647 B2 | 11/2006 | Larsen | |
| 7,683,928 B2 | 3/2010 | Lubard et al. | |
| 7,688,348 B2 | 3/2010 | Lubard et al. | |
| 8,184,276 B2 | 5/2012 | Embry | |
| 8,380,375 B2 | 2/2013 | Tink | |
| 8,467,044 B2 | 6/2013 | Embry | |
| 8,903,576 B2 | 12/2014 | Tink | |
| 8,929,176 B2 | 1/2015 | Debrunner et al. | |
| 8,960,008 B1 | 2/2015 | Blackmon et al. | |
| 9,223,025 B2 | 12/2015 | Debrunner et al. | |
| 9,229,108 B2 | 1/2016 | Debrunner et al. | |
| 9,330,633 B2 | 5/2016 | Sakai et al. | |
| 9,348,026 B2 | 5/2016 | Armbruster et al. | |
| 9,511,831 B2* | 12/2016 | Kimura | B63C 11/52 |
| 9,568,590 B1 | 2/2017 | Haupt et al. | |
| 9,776,695 B2* | 10/2017 | Kimura | B63C 11/52 |
| 9,846,232 B1 | 12/2017 | Thompson et al. | |
| 10,183,732 B2* | 1/2019 | Celikkol | G01C 21/20 |
| 10,450,041 B2* | 10/2019 | Kimura | G05D 1/0692 |
| 2002/0038187 A1 | 3/2002 | Maness et al. | |
| 2002/0170792 A1 | 11/2002 | Phelan et al. | |
| 2003/0079774 A1 | 5/2003 | Reyman | |
| 2004/0093174 A1 | 5/2004 | Lander | |
| 2004/0261547 A1 | 12/2004 | Russell et al. | |
| 2005/0060105 A1 | 3/2005 | Lander | |
| 2005/0279169 A1 | 12/2005 | Lander | |
| 2006/0221349 A1 | 10/2006 | Que et al. | |
| 2006/0233485 A1 | 10/2006 | Allen | |
| 2007/0095153 A1 | 5/2007 | Rieder et al. | |
| 2007/0130317 A1 | 6/2007 | Lander | |
| 2007/0199383 A1 | 8/2007 | Lander et al. | |
| 2007/0242134 A1* | 10/2007 | Zernov | H04N 5/2252 348/81 |
| 2008/0300742 A1* | 12/2008 | Weaver | B63C 11/40 701/21 |
| 2009/0114140 A1* | 5/2009 | Guerrero | B63C 11/52 114/321 |
| 2009/0287414 A1* | 11/2009 | Vickery | G01S 15/874 701/500 |
| 2010/0037707 A1 | 2/2010 | Bitto et al. | |
| 2010/0089161 A1 | 4/2010 | Taheri | |
| 2010/0324839 A1 | 12/2010 | Martin | |
| 2011/0088910 A1 | 4/2011 | McCann et al. | |
| 2011/0116074 A1 | 5/2011 | Valla et al. | |
| 2011/0144930 A1 | 6/2011 | Bruno et al. | |
| 2011/0197681 A1 | 8/2011 | Rieder et al. | |
| 2011/0229141 A1* | 9/2011 | Chave | H04B 13/02 398/104 |
| 2012/0007743 A1 | 1/2012 | Solomon | |
| 2012/0062963 A1 | 3/2012 | Gillham et al. | |
| 2012/0101715 A1* | 4/2012 | Tangirala | G01C 21/165 701/408 |
| 2012/0213320 A1 | 8/2012 | Lange et al. | |
| 2013/0030577 A1 | 1/2013 | Jarrell et al. | |
| 2013/0061688 A1 | 3/2013 | Hayward | |
| 2014/0003193 A1* | 1/2014 | Schmidt | G01S 15/93 367/88 |
| 2014/0022530 A1 | 1/2014 | Farhadiroushan et al. | |
| 2014/0054429 A1 | 2/2014 | Conzen et al. | |
| 2014/0078409 A1* | 3/2014 | Wang | G03B 21/16 349/5 |
| 2014/0174186 A1 | 6/2014 | Salomon | |
| 2014/0268107 A1 | 9/2014 | Kremeyer | |
| 2014/0283585 A1 | 9/2014 | Sæther | |
| 2014/0300885 A1* | 10/2014 | Debrunner | G01S 17/89 356/4.01 |
| 2014/0320629 A1 | 10/2014 | Chizeck et al. | |
| 2014/0328141 A1* | 11/2014 | Rikoski | G01S 15/104 367/91 |
| 2015/0078123 A1 | 3/2015 | Batcheller et al. | |
| 2015/0116692 A1 | 4/2015 | Zuk et al. | |
| 2015/0153743 A1 | 6/2015 | Jarrell et al. | |
| 2015/0319347 A1* | 11/2015 | Cottrell | H04N 5/2256 348/81 |
| 2015/0363914 A1 | 12/2015 | Boyle et al. | |
| 2016/0121009 A1* | 5/2016 | Farr | H04B 13/02 250/492.1 |
| 2016/0198069 A1* | 7/2016 | Boyle | G06F 16/58 348/81 |
| 2016/0198074 A1 | 7/2016 | Boyle et al. | |
| 2016/0253906 A1* | 9/2016 | Celikkol | G01S 3/784 701/21 |
| 2016/0320526 A1 | 11/2016 | Chen et al. | |
| 2017/0074664 A1* | 3/2017 | Cheramie | G05D 1/0875 |
| 2017/0089829 A1 | 3/2017 | Bartholomew | |
| 2017/0328751 A1 | 11/2017 | Lemke | |
| 2017/0328982 A1 | 11/2017 | Jongsma et al. | |
| 2018/0194446 A1* | 7/2018 | Fruhling | B63G 8/001 |
| 2018/0321385 A1 | 11/2018 | Embry et al. | |
| 2019/0031308 A1* | 1/2019 | Daley | B63G 8/14 |
| 2019/0084658 A1* | 3/2019 | Bonel | B63C 11/52 |
| 2019/0219701 A1 | 7/2019 | Embry et al. | |

FOREIGN PATENT DOCUMENTS

| | | |
|---|---|---|
| WO | WO 2016/142576 | 9/2016 |
| WO | WO 2019/014245 | 1/2019 |
| WO | WO 2019/014253 | 1/2019 |

OTHER PUBLICATIONS

Notice of Allowance for U.S. Appl. No. 16/031,867, dated Aug. 1, 2019, 7 pages.

Notice of Allowance for U.S. Appl. No. 16/559,005, dated Oct. 21, 2019, 7 pages.

"Chevron Frade Field Incident," YouTube, Nov. 24, 2011, 11 pages [retrieved from: www.youtube.com/watch?v=OtJTI4nv1QI].

"Subsea Piping Vibration for new and existing systems," Wood, 2018, 3 pages [retrieved online from: www.betamachinery.com/services/subsea-piping-vibration].

"Subsea Acceleration and Vibration Logger," Omni Instruments, 2009, 4 pages [retrieved online from: www.omniinstruments.co.uk/subsea-acceleration-and-vibration-logger.html].

(56) References Cited

OTHER PUBLICATIONS

"Subsea Leak Detection—an Overview," Neptune Oceanographics Limited, 2015, 5 pages [retrieved online from: www.neptuneoceanographics.com/documents/LeakReport2015.pdf].

"Ultrasonic Intelligent Sensors ClampOn Subsea 3D Vibration Monitor Digital Signal Processing," ClampOn AS, May 2016, 2 pages.

Coimbra et al. "Chevron fined $28 million, faces Brazil spill backlash," Reuters, Nov. 21, 2011, 12 pages [retrieved online from: www.reuters.com/article/us-chevron-brazil/chevron-fined-28-million-faces-brazil-spill-backlash-idUSTRE7AG15S20111122].

Hariharan et al. "Drilling Riser Management in Deepwater Environments," Pulse Structural Monitoring, Feb. 2007, 9 pages [retrieved online from: www.pulse-monitoring.com/assets/uploads/cms/files/118-64.pdf].

Lim et al. "Deepwater Riser VIV, Fatigue and Monitoring," Presented at Deepwater Pipeline & riser Technology Conference, Houston, Mar. 6-9, 2000, 12 pages [retrieved online from: www.puls-monitoring.com/assets/uploads/cms/files/135-64.pdf].

Nilson "Ultrasonic Intelligent Sensors Advanced LPHP Subsea 3D Vibration Monitor," ClampOn AS, Jun. 2016, Revision 3, 2 pages.

Nilson "Ultrasonic Intelligent Sensors Standalone LPHP Subsea Vibration Monitor," ClampOn AS, Jun. 2016, Revision 4, 2 pages.

Paschoa "Understanding Subsea Acoustic Leak Detection and Condition Monitoring—Part 2," Marine Technology News, Oct. 7, 2014, 7 pages [retrieved online from: https://www.marinetechnologynews.com/blogs/understanding-subsea-accoustic-leak-detection-and-condition-omonitoring-e28093-part-2-700516].

Prats et al. "Template Tracking and Visual Servoing for Alignment Tasks with Autonomous Underwater Vehicles," The International Federation of Automatic Control, Sep. 19-21, 2012, 9th IFAC Conference on Manoeuvring and Control of Marine Craft, 2012, Arenzano, Italy, 6 pages.

Skalle et al. "Wells and Well Intervention, Evaluation of deepwater kicks and future countermeasures," Norwegian University of Science and Technology, Mar. 2012, 15 pages [retrieved online from: www.ipt.ntnu.no/~pskalle/files/TechnicalPapers/23_deepwaterkick.pdf].

International Search Report and Written Opinion for International (PCT) Patent Application No. PCT/US18/41479, dated Nov. 20, 2018 17 pages.

U.S. Appl. No. 16/031,867, filed Jul. 10, 2018, Embry et al.

U.S. Appl. No. 16/707,204, filed Dec. 9, 2019, Embry et al.

International Preliminary Report on Patentabiiity for international (PCT) Application No. PCT/US2018/041479, dated Jan. 23, 2020, 10 pages.

\* cited by examiner

UNDERWATER OPTICAL POSITIONING SYSTEMS AND METHODS

CROSS-REFERENCE TO RELATED APPLICATIONS

This application claims the benefit of U.S. Provisional Patent Application Ser. No. 62/530,747, filed Jul. 10, 2017, the entire disclosure of which is hereby incorporated herein by reference.

FIELD

The present disclosure is directed to methods and systems for determining and facilitating the positioning of objects underwater.

BACKGROUND

The installation of underwater equipment, such as wellheads, manifolds, risers, anchors, Pipeline End Terminations (PLETS), Blow Out Preventors (BOPs), subsea production systems, touch down points, suction piles, chains, slip joints, concrete mats, and pipelines on the seafloor can be difficult, and improper installation is costly on many fronts. Often, underwater equipment is installed using specialty surface vessels fitted with remotely operated vehicles (ROVs) and cranes. The operator is often physically removed from the actual installation area, resulting in a lack of spatial awareness. Because of the difficulties inherent to positioning equipment in an underwater environment, placing such equipment with desired levels of precision is difficult. In addition, particularly where the equipment is being installed in a field containing other equipment or is being positioned for connection to equipment already in place, there is a risk of damage due to collisions.

Current installation techniques involve the use of an acoustic beacon, which is mounted on the object or structure to be installed along with an ultra-short baseline (USBL) or long baseline (LBL) array, often aided by inertial navigation, to provide location information to a crane operator at the surface. The location information (X, Y, Z position and heading) is transmitted to the surface through an acoustic communication method either directly to the surface vessel or via underwater vehicle. The operator is provided with a display of data, for example in the form of range and heading information, regarding placement of the equipment. However, the location information is very coarse (measured in feet) and the feedback is slow due to the acoustic link.

Once the object is located within visual range of physical marker buoys or a physical boundary box on the seabed, the placement operation switches to visual placement. The physical marker buoys are positioned using the same USBL or LBL acoustic array. The operator uses remote video in order to determine the positioning of equipment during final installation. The inherent issue with video is it only provides 2-D information. In addition, video systems can be compromised or even rendered useless by turbid water conditions. In addition, even relatively sophisticated video systems can suffer from limited fields of view, unnatural perspectives, distortion, lighting limitations, and limited depth of field. Also, existing systems have had only a limited ability to provide absolute location information, or location information relative to emplaced structures.

In addition, the information is not easily translated to an exact location within an imaged area of the underwater environment. An alternate technique uses an ROV to track the structure using video cameras as it is being lowered. However, this provides very coarse alignment and positioning information regarding the structure, and the position of the structure being positioned relative to other structures is difficult to determine.

In some situations it is possible to use divers or operators in submersible vehicles for installing equipment. However, even when an operator has a direct line of sight during the installation process, their view of the scene can be obstructed or obscured. In addition, absolute and relative location data available to operators using previous techniques remains limited.

Accordingly, it would be desirable to provide systems and methods that provided accurate and useful information to assist operators or automated systems in positioning equipment in underwater environments.

SUMMARY

The present disclosure provides devices, systems and methods for use in the positioning of equipment, vehicles, or other objects in underwater environments. Positioning systems in accordance with embodiments of the present disclosure can include one or more metrology or monitoring systems, and one or more projection systems. In accordance with at least some embodiments of the present disclosure, the positioning system can include an integrated monitoring and projection system. In operation, a monitoring system component of the positioning system determines a target location for an object, and a projection system component of the positioning system projects a visible target for use in positioning the object.

In accordance with embodiments of the present disclosure, a monitoring system included in a positioning system can comprise an active, light-based metrology system or sensor. In accordance with at least some embodiments of the present disclosure, a monitoring system includes a light detection and ranging system (hereinafter "lidar") monitoring device. In such embodiments, the lidar device can be in the form of a scanning lidar, flash lidar, pulsed laser lidar, amplitude modulated continuous wave (AMCW) phase detection lidar, chirped AMCW lidar, amplitude frequency modulated continuous wave (FMCW) lidar, true FMCW lidar, pulse modulation code, or other lidar system. Moreover, the lidar system can incorporate a pulsed or modulated continuous wave laser light source. Other embodiments can include a monitoring system incorporating a laser triangulation, photometric stereo, stereoscopic vision, structured light, photoclinometry, stereo-photoclinometry, holographic, digital holographic, or other device that uses light to sense 3-D space. The monitoring system is placed in the vicinity of the object being positioned. In accordance with embodiments of the present disclosure, multiple pieces of equipment or other objects can be monitored by a single monitoring system simultaneously. In accordance with further embodiments of the present disclosure, multiple monitoring systems are used in combination to monitor one or more pieces of subsea equipment.

A projection system included in a positioning system in accordance with embodiments of the present disclosure includes a light source and a pointing or scanning device. In accordance with at least some embodiments of the present disclosure, the monitoring system is integrated with the projection system. Alternatively, the projection system can be provided separately from the monitoring system. Whether integrated with or provided separately from the monitoring system, the projection system can receive location information from the monitoring system that is applied by the projection system to project a visible target at a desired location. In accordance with still other embodiments, the visible target can be provided in various forms. Moreover, the visible target can comprise or can be supplemented with various indicia, including target lines, scales, range, depth, coordinates, time, proximity warnings, or the like.

Methods in accordance with embodiments of the present disclosure include determining a desired target location for an object. This can include geolocating the desired location within an absolute reference frame or determining the target location relative to other underwater objects or features. A visible target is then projected, to demarcate the target location to an operator. In accordance with at least some embodiments of the present disclosure, the visible target can be projected in consideration of a point of view of the operator or of a camera used to provide a view of the scene to an operator who is located remotely. In accordance with still other embodiments, the projection can be continuously updated, for example to account for movement in the point of view of the operator, or to assist the operator in avoiding contact between the object being positioned and underwater structures while the object is being moved towards its target location.

In operation for installation measurements, the positioning system is placed on the seabed in the vicinity of the structure to be installed. The positioning system is then geolocated. Underwater geolocation is typically performed with acoustic beacons or an Inertial Navigation System (INS). The positioning system can then be operated to project a visible target, such as a target box or pattern, on the seafloor or on a selected object. In accordance with embodiments of the present disclosure, the location of the projected target is a predetermined geolocation. Moreover, the projected target can have a predetermined orientation. In accordance with further embodiments of the present disclosure, the location of the projected target is selected by a user, with a position and heading relative to the geolocation of the monitoring device. In addition, the target location of the object to be placed or installed can be determined with reference to geo-located monuments or other references. In accordance with at least some embodiments of the present disclosure, the projected target is a target box demarcating an area in which an object is to be placed.

Advantages of embodiments of the present disclosure over conventional systems and methods for positioning objects in underwater environments include providing high precision location information from a flexible, agile system, without requiring the installation of physical markers. In addition, embodiments of the present disclosure can provide an easily perceived marker for facilitating the accurate placement of objects in underwater environments. The described methods and devices increase the accuracy and efficiency of installation and monitoring capability during installation, drilling, and general construction.

Additional features and advantages of embodiments of the present disclosure will become more readily apparent from the following description, particularly when taken together with the accompanying drawings.

DETAILED DESCRIPTION

Figure 1:
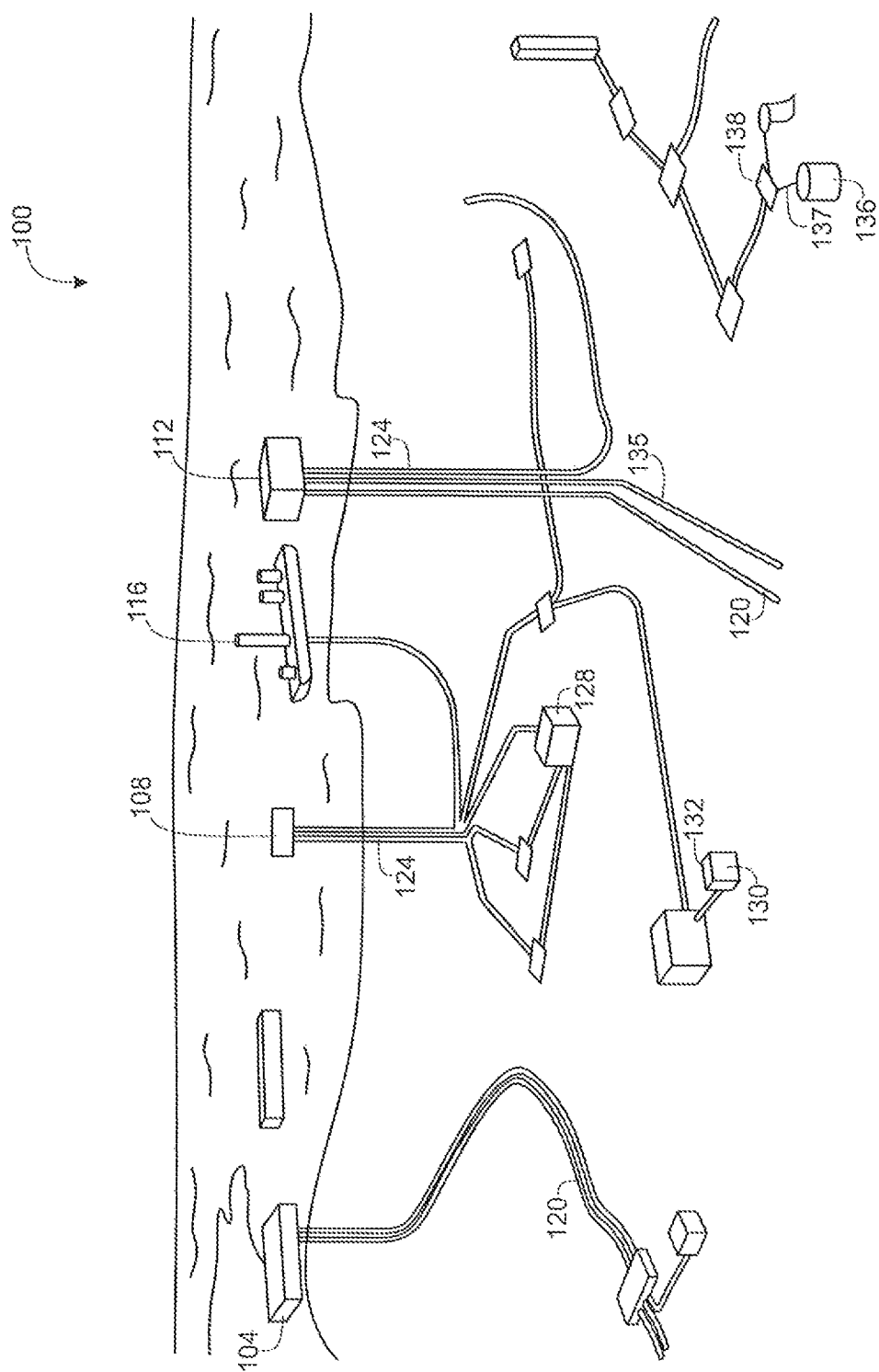
FIG. 1 depicts an example of an underwater environment in which systems and methods in accordance with embodiments of the present disclosure can be employed.

Embodiments of the present disclosure provide systems and methods that can be used in connection with the placement of objects in underwater environments. FIG. 1 depicts a drilling and production system 100, which is an example of an environment in which embodiments of the present disclosure can be employed. The drilling and production system 100 can include a variety of surface and subsea or underwater components. As examples, and without limitation, these can include processing platforms 104, jack-up platforms 108, floating platforms 112, pipelay vessels 116, pipelines 120, risers 124, manifolds 128, wells 130, touch down points 135, suction piles or anchors 136, chain 137, slip joints 138 and blowout preventers 132. As can be appreciated by one of skill in the art, the various components of the system 100 often need to be positioned with a high level of accuracy, to enable intended functions to be performed, to operatively connect to other components, and/or to avoid interfering with the operation of other underwater components.

Figure 2:
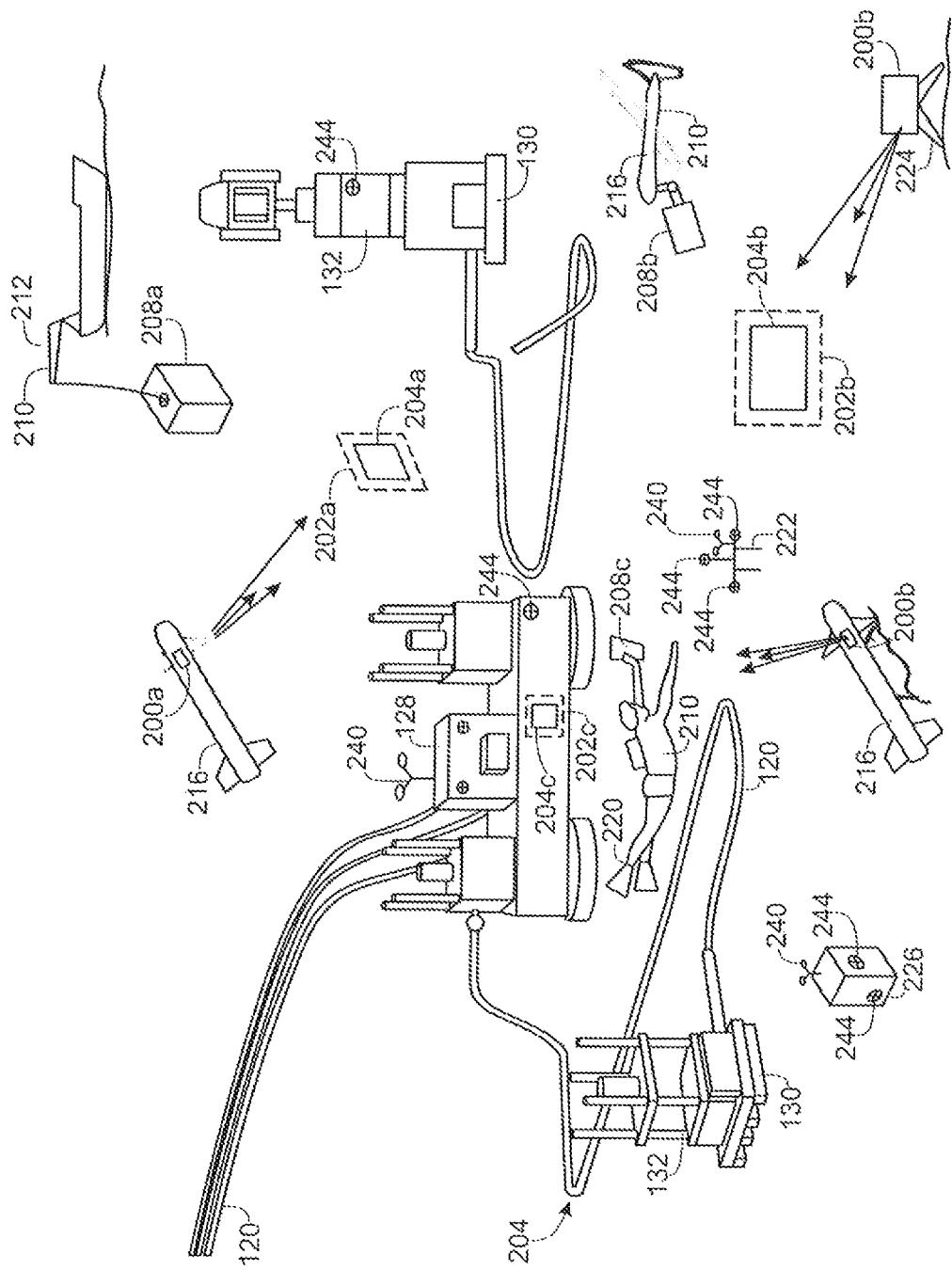
FIG. 2 depicts objects being positioned in an underwater environment with the assistance of a positioning system in accordance with embodiments of the present disclosure.

FIG. 2 depicts an underwater environment in which a positioning system 200 in accordance with embodiments of the present disclosure can be employed to assist in placing an object at a target location 202. In particular, one or more positioning systems 200 are depicted, mounted to or associated with a platform 224, or carried by a submersible vehicle 216. The positioning systems 200 operate to determine a target location 202 of an object 208, and to project an image or target indicia 204 to aid in the positioning of the object 208 at a corresponding target location 202. As described in greater detail elsewhere herein, the location or area at which the visible target 204 is projected can be determined by an active, light-based metrology or monitoring system, such as a laser system. Moreover, in at least some embodiments of the present disclosure, the light source used by a monitoring system is also used to generate the projected target 204. In the example of FIG. 2, the underwater environment includes components of a drilling and production system as depicted in FIG. 1, however, embodiments of the present disclosure can be applied to any underwater environment or system.

As shown in this example, the objects 208 can be positioned using various emplacing equipment 210. For instance, a first object 208*a* is shown being put into position by a crane 212, a second object 208*b* is shown being placed into position by a submersible vehicle 216, and a third object 208*c* is shown being placed into position by a diver 220. In each instance, one or more positioning systems 200*a-c* are used to determine the target location for a particular object 208, and to project the target indicia 204*a-c* that serves as a visual aid to an operator in placing the object 208 at the target location 202*a-c*. The projected image or target indicia 204 is visible to the operator of the emplacement equipment 210, for example through a video system, or via a direct line of sight between the operator and the target location 202. Accordingly, the positioning system 200 can operate to actively assist the positioning of objects 208 in an undersea environment. The positioning system 200 can also be used to assist with positioning an object 208 on a stationary structure, or in connection with docking an underwater vehicle 216 or an object 208 with another underwater vehicle 216 or object 208. In accordance with embodiments of the present disclosure, target stands 222, geo-located monuments 226, or other reference points can be included in the scenario and can provide additional location information to the positioning system 200.

A positioning system 200 in accordance with embodiments of the present disclosure is positioned in the vicinity of a target location 202 for an object 208. The positioning system 200 can be mounted to a stationary platform or structure 224. As can be appreciated by one of skill in the art, a positioning system 200 mounted to a stationary platform or structure 224 has an inherent conical field of regard. By incorporating a pan and tilt head in the positioning system 200, the field of regard can be increased to a full 360°, or even to over a hemisphere field of regard. As can further be appreciated by one of skill in the art after consideration of the present disclosure, a positioning system 200 can be mounted to a movable platform or vehicle 216, directly or via a pan and tilt head. As examples, but without limitation, a moveable platform or vehicle 216 can include a frame or cage that is moved by a crane, or a vehicle, such as but not limited to an autonomous underwater vehicle (AUV), a remotely operated vehicle (ROV), a submersible vehicle, or the like. Moreover, a moveable platform or vehicle 216 can be held stationary, for example by landing the platform or vehicle 216 on the seafloor or other structure, by clamping onto a structure, or by holding it in a hovering mode, while the positioning system 200 is in operation. As discussed in greater detail elsewhere herein, a monitoring system component of the positioning system 200 can be operated to scan all or portions of an underwater scene to determine location information, and a projection system component of the positioning system 200 can be operated to project the target indicia 204.

In accordance with embodiments of the present disclosure, three-dimensional 240 and/or two-dimensional 244 targets can be fixed to various objects in the underwater environment, such as components of a drilling and production system 100, for example, pipelines 120, risers 124, manifolds 128, wells 130, touch down points 135, anchors, suction piles, pin piles, blowout preventers 132, or other structures, target stands 222, monuments 226, stationary platforms 224, moveable platforms or vehicles 216, or any other underwater object. As discussed in greater detail elsewhere herein, these targets 240, 244 are specifically designed to provide control points within an image or within 3-D point cloud data produced by the monitoring system component of a positioning system 200. The inclusion of targets 240, 244 can facilitate the accurate determination of a target location within an underwater environment.

Figure 3:
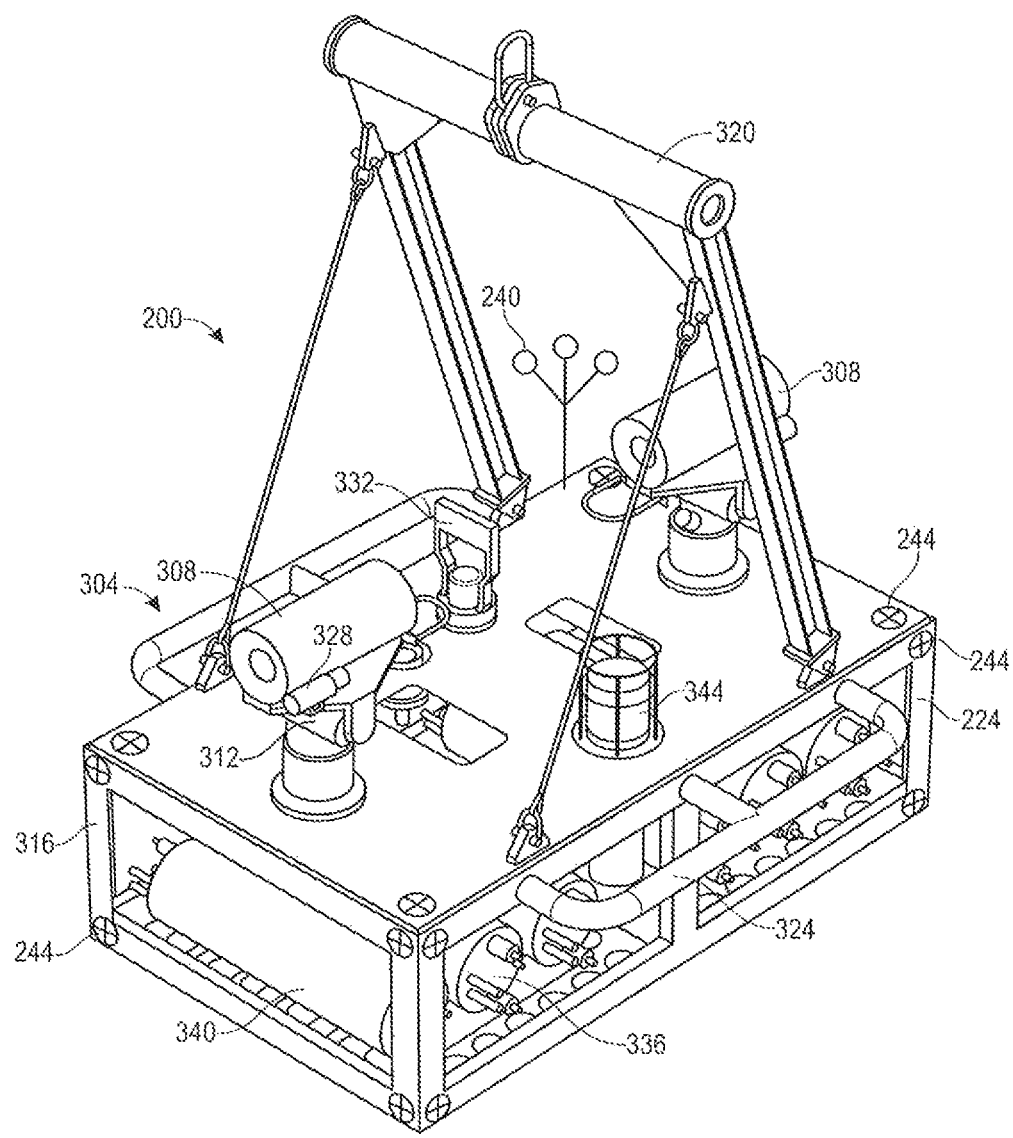
FIG. 3 depicts a positioning system in accordance with embodiments of the present disclosure.

FIG. 3 depicts a positioning system 200, mounted to a supporting structure 224, in accordance with at least some embodiments of the present disclosure. The positioning system 200 generally includes a monitoring system 304. The monitoring system 304 can comprise active, light based systems, such as one or more lidar devices 308. In the illustrated example, the positioning system 200 includes two lidar devices 308, each of which is associated with a pan and tilt head 312 that can be operated to point the associated lidar device 308 along a selected line of sight. Alternatively or in addition to a lidar device 308, the positioning system 200 can include other optical metrology systems. The supporting structure 224 can comprise a frame 316 that is in turn mounted to a stationary pad, a mud mat, another structure on the seabed, or placed directly on the seabed. The frame 316 can be designed to be lowered by a crane from the surface vessel or rig or can be designed to be deployed via an ROV. The frame 316 can be lowered using a crane lift 320. The lift 320 can be connected to the remainder of the frame 316 by a hinge so it lowers after deployment. This allows the lift 320 to drop out of the field of view of the lidar devices 308. The frame 316 can also include ROV manipulator handles 324 to facilitate positioning the frame 316 using an ROV or AUV. For example, the frame 316 can be placed on a monument 226 or other structure. The bottom of the frame 316 can have a pin or receptacle, so it can be lowered onto a mating receptacle or pin on a structure to enable precise location and alignment. In accordance with other embodiments of the present disclosure, the frame 316 may be carried by a vehicle, such as an ROV. In accordance with still other embodiments of the present disclosure, a positioning system 200 can be mounted to a vehicle via a pan and tilt head or can be mounted directly to a vehicle.

In at least some embodiments of the present disclosure, the positioning system 200 can itself comprise a subsea system with a platform with numerous selectable functions. In embodiments in which the positioning system 200 includes a support structure or frame 316 that holds multiple lidar devices 308, the lidar devices 308 can be precisely located on the single structure so they create a single referenced point cloud. By mounting the lidar devices 308 on pan and tilt heads 312, they can provide hemispherical coverage. Cameras and lights 328 can be mounted on the support structure 316 or the pan and tilt heads 312 to enable the acquisition of visual data along with the lidar data. A hot stab 332 can be included to enable the positioning system 200 to connect to the local infrastructure for power and/or communications. The positioning system 200 can further include one or more non-optical point sensors, such as a conductivity, temperature, and depth (CTD) device 336. Alternately or in addition, batteries and a power control system 340 can be included which allow for long-term autonomous deployment. The positioning system 200 can also provide additional capabilities including, but not limited to, data storage and backup, vibration sensors, turbidity sensors, various chemical sensors, and communication devices. The communication devices can include RF, optical, or acoustic devices. The communication devices can communicate with ROVs, AUVs, resident vehicles, other intelligent structures in the field, or systems on the surface. In accordance with still other embodiments the positioning system 200 can provide timing signals (if needed) between multiple sensors to time-synchronize the data collection of multiple sensors, such as from multiple lidar devices 208, cameras 328, CTD 336, sonars, INU, and other devices. A single positioning system 200 can provide power, data storage, and communications for other positioning systems 200 or lidar devices 308, to support multiple monitoring points of view within an underwater environment.

An acoustic transceiver 344 can be included which enables the positioning system 200 to be geo-spatially located using an acoustic positioning system. These can include Ultra-Short Baseline (USBL), Long Baseline (LBL) or other acoustic positioning systems. 2-D targets 244 can be mounted to the frame 316 or other components of the monitoring system, and 3-D targets 240 can be mounted to the frame 316 or other components of the positioning system 200, to facilitate precisely locating the positioning system 200 within a field.

Figure 4A:
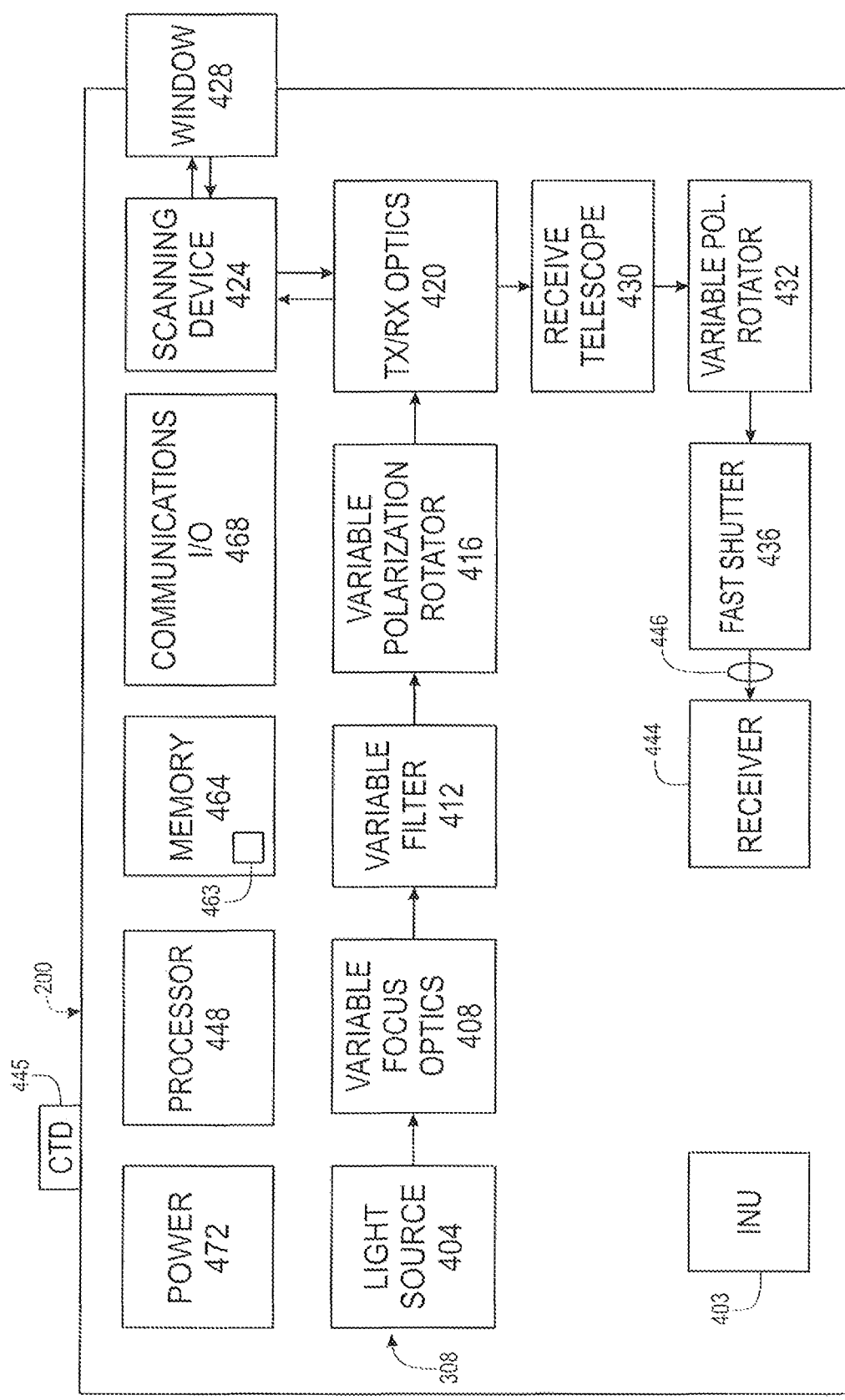
FIGS. 4A and 4B are block diagrams depicting functional components of positioning systems in accordance with embodiments of the present disclosure.
Figure 4B:
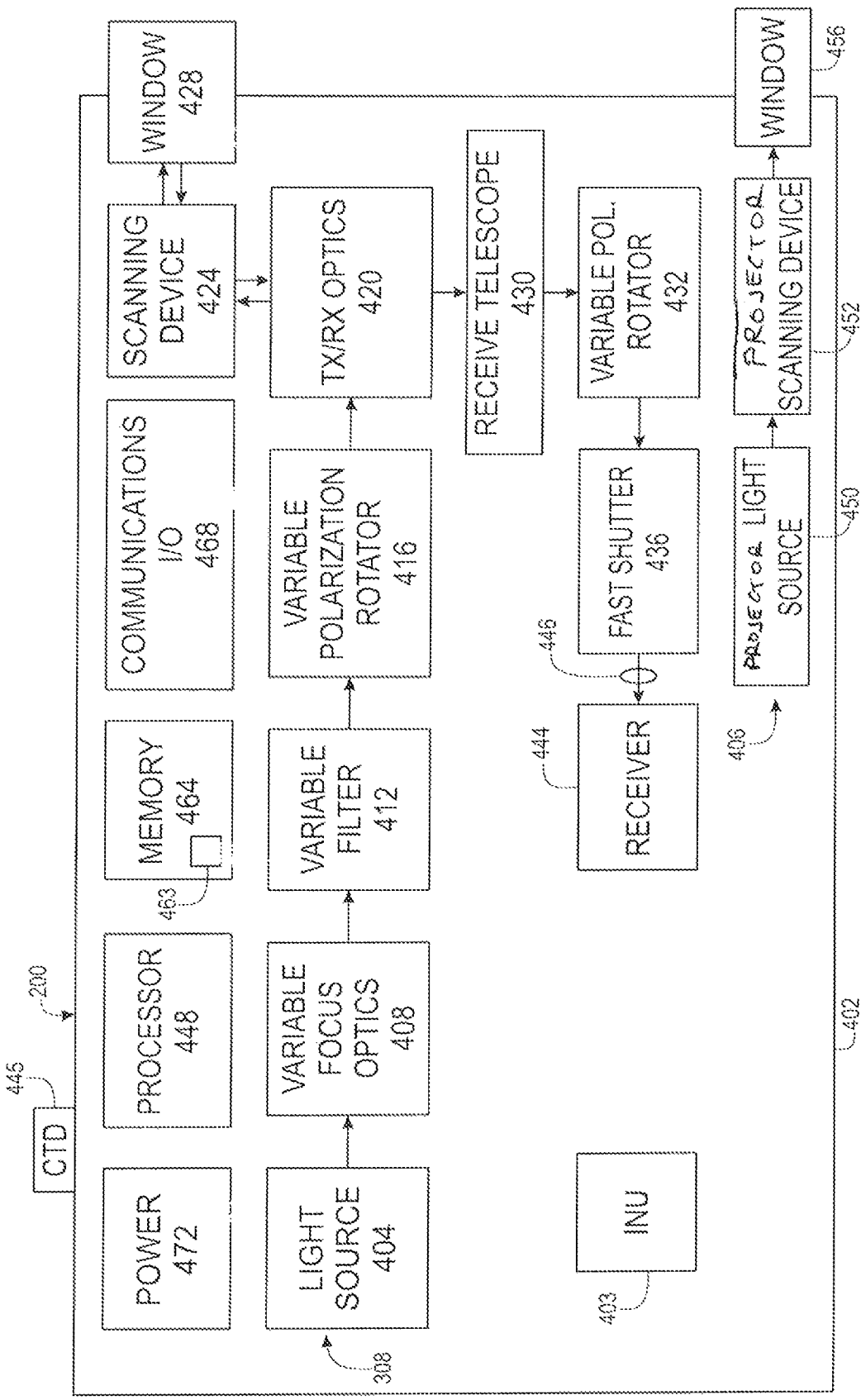

FIGS. 4A and 4B are block diagrams depicting components of a positioning system 200 that may be contained within an underwater pressure vessel 402 or co-located with one another in accordance with embodiments of the present disclosure. FIG. 4A is different from FIG. 4B in that the latter includes a separate projection system 406 for generating a projected target 204. As the other components of the depicted positioning systems 200 are generally the same, the present description will apply to both FIGS. 4A and 4B, except where otherwise noted. The positioning system 200 includes a lidar device 308 or other monitoring or metrology system, such as but not limited to an optical metrology system. As can be appreciated by one of skill in the art, a lidar device 308 is an active optical system that operates by transmitting light towards a target, receiving reflected light from the target, and determining the range to the target based upon time of flight information determined from the amount of time elapsed between the transmission of light from the light source and the time at which the reflected light or return signal is received at a receiver. As used herein, a target can include an area or feature on the sea floor, an object 208, or any other underwater structure or feature, including man-made structures and natural features or structures, 3-D targets 240 mounted to an underwater structure or placed on the sea floor, and 2-D targets 244 applied to an underwater structure or placed on the sea floor. In addition, the location of a point on the target from which light is reflected can be located relative to the lidar device 308 in three-dimensional space by combining the range information with the known azimuth and elevation information via scanner location (e.g. as an azimuth angle and an elevation angle) for scanning lidar devices 308, pixel location for multi-pixel lidar devices 308, or a combination of the two. The fourth dimension, time, is also recorded so measurements and features can be compared over time.

As can be appreciated by one of skill in the art after consideration of the present disclosure, the lidar device 308 enables the positioning system 200 to determine locations relative to the positioning system 200, or relative to objects within the field of regard of the lidar device 308, or that otherwise have a known relative location. Moreover, where a reference target 240, 244, monument 226, or other object within the field of regard of the lidar device 308 or having a known location relative to the positioning system 200 has a known absolute location, the lidar device 308 can determine the absolute location of the positioning system 200 itself and of the objects 208 within the field of regard of the positioning system 200. Alternatively or in addition, a navigation system, such as an Inertial Navigation Unit (INU) 403, can be used to provide information regarding the location of the positioning system 200, and in turn of objects within the field of regard of the lidar device 308. The INU 403 can be used independently or in conjunction with other positioning systems, including acoustic positioning systems, such as acoustic beacons, super-short baseline (SSBL) systems, ultra-short baseline (USBL) systems, or long baseline (LBL) systems.

The components of the positioning system 200 thus include a light source 404. The light produced by the light source 404 can be collimated or variably focused by optics 408. In accordance with at least some embodiments of the present disclosure, the light source 404 is a pulsed beam laser. As can be appreciated by one of skill in the art after consideration of the present disclosure, the light source 404 can produce light having a selected wavelength or range of wavelengths. As an example, but without limitation, the light source 404 may comprise a blue-green laser light source. As a further example, the light source 404 may have an output centered at 532 nm. Other wavelengths can also be used, for example to optimize performance in response to various water conditions. In accordance with still other embodiments, the light source 404 may produce non-collimated light. In accordance with still other embodiments, the light source 404 may be light emitting diode (LED) based, continuous wave (CW) laser based, modulated CW based, structured light, or some other light source.

The variable focus optics 408 can include traditional mechanical focusing elements, or non-mechanical elements, such as may be provided by fluid lenses, liquid crystal devices, electro-optic devices, and other optical elements. The ability to focus the beam can be used to optimize signal return for a specific target at a specific range for specific water conditions. The light can then be adjusted in magnitude by a variable filter or attenuator 412. This is advantageous for underwater sensing as the attenuation of seawater or other water bodies can vary dramatically, thus dramatically changing the return signal, which can strain the dynamic range of the receiver. One method for reducing the required dynamic range of the receiver is to adjust the light output power from the transmitter. This can be achieved by the variable attenuator 412. As examples, the variable attenuator 412 can include standard neutral density filters, other attenuation filters, or polarization elements.

The optical train can also include a variable polarization rotator 416. It is known that the polarization of the transmitted light can affect the backscatter power, which is a source of noise at the lidar device 308 receiver. Transmission range can therefore be optimized by adjusting the polarization rotation of the output light. The variable polarization rotator 416 can impart any polarization to the output light.

Transmit and receive (Tx/Rx) optics 420 are used to make the sensor monostatic. Monostatic sensors have the distinct advantage of simplified scanning as the transmitter and receiver are pointed at the same location with the same scanning mechanism, resulting in calibration and reliability performance that is superior to bistatic systems. A scanning device 424 can then be used to accurately direct the transmitted beam and the field of view of the receiver simultaneously to a scene through a window 428 in the enclosure 402. The scanning device 424 can include a steering mirror or other beam steering device, such as a micro-electromechanical system (MEM), liquid crystal, acousto-optic, or electro-optic device, for precise control of the pointing of the light source and receiver toward a target location 202, such as an underwater structure, and at known angles relative to the positioning system 200.

Light reflected from the target is received by the scanning device 424 and is split by a beam splitter element included in the Tx/Rx optics 420. Light from the Tx/Rx optics 420 is provided to a receive telescope 430, which is configured to focus the received light so that it can be imaged onto the sensor elements of a receiver 444 included in the positioning system 200. In at least some embodiments the receive telescope 430 collimates the light and it is then focused by focusing optic 446. A variable polarization rotator 432 can be included to optimize the signal-to-noise ratio (SNR) of the return signal by selecting the optimal polarization for the hard target return.

A fast shutter 436 is provided to block any stray light from the primary beam as it exits the window 428, after being directed by the scanning device 424. The fast shutter 436 is timed with high speed electronics, which may be implemented by a processor 448, to block the window 428 reflection from a transmitted pulse and then open quickly to capture returns from close targets. Light passed by the fast shutter 436 is then provided to the receiver 444. The receiver 444 detects the light reflected from a target, and timing and intensity information regarding the received signal is used to create a 3-D point cloud data. The receiver 444 thus is an optical sensor or detector, such as a photodiode, an avalanche photodiode, a photomultiplier tube, a silicon photomultiplier tube, a Geiger mode avalanche photodiode, charge coupled device (CCD) detector, complementary metal oxide semiconductor (CMOS) detector, or other optical detector. It can also include an electronic amplifier and/or thermal control elements and circuitry. In addition, the receiver 444 can include or be associated with a narrow band filter to reduce background light. A focusing optic 446 can be included to focus received light onto the sensor of the receiver 444. In accordance with embodiments of the present disclosure, the receiver 444 may comprise a single or multiple pixel sensor. Information regarding the range to the target is monitored by a processor 448, which controls and/or has access to information regarding the time at which transmitted light is output, and the time at which a return signal, comprising transmitted light that has been reflected from a target, is received by the receiver 444. In addition, information from the scanning device 424, from a pan and tilt head 312, and/or the location of a receiving pixel in a lidar device 308 having a multiple pixel sensor as the receiver 444 can be used by the processor 448 to determine the azimuth angle and elevation angle to the target. This information can then be combined with timing information, and in particular the time at which the transmitted pulse of light produced by the light source 404 is sent towards the target, and the time that the return signal is received at the receiver 444. The range measurement determined from the timing information can then be applied to obtain a location of the target relative to the positioning system 200. As can be appreciated by one of skill in the art after consideration of the present disclosure, the intensity information obtained by the receiver 444 can be analyzed in connection with determining, for example, whether the return is from an underwater structure, water, or a plume of fluid. Moreover, the intensity may be provided from the sensor as a voltage signal.

The processor 448 can include any processor capable of performing or executing instructions encoded in system software or firmware 463 stored in data storage or memory 464, such as a general purpose programmable processor, controller, Application Specific Integrated Circuit (ASIC), Field Programmable Gate Array (FPGA), or the like. Moreover, the execution of that software or firmware 463 can control the operation of the lidar system 308, including the acquisition of point cloud data that includes azimuth angle, elevation angle, intensity, and range information taken from an underwater scene. In accordance with further embodiments of the present disclosure, the execution of the software 463 can operate to determine a position of an object 208 and a position of a target location 202. In accordance with still further embodiments, execution of the software 463 can operate to control at least one of the light source 404 and a projector 450 to project a visible target 204. Moreover, the software 463 can operate to predict a future location of a moving object 208, to generate and report data regarding the object 208, the target location 202, to exchange information with other positioning systems, to exchange information with a user interface, server system, or other computing node in communication with the positioning system, or the like. Different operations of the software 463 can be distributed amongst different programs, applications, or software modules. The execution of the software 463 by the processor 448 can be performed in conjunction with the memory 464. Moreover, the function of the memory 464 can include the short or long-term storage of timing information, range information, point cloud data generated by the lidar system 308, control point locations, or other control information or generated data. The memory 464 can comprise a solid-state memory, hard disk drive, a combination of memory devices, or the like. The positioning system 200 can additionally include various sensors. For example, the positioning system 200 can include a CTD device 445 for measuring the conductivity (and thus the salinity), the temperature, and the depth of the water at the location of the positioning system 200. Because a CTD device 445 must be in direct contact with the surrounding water, it can be mounted outside of or adjacent an aperture in the enclosure 402.

As can be appreciated by one of skill in the art after consideration of the present disclosure, the basic components of the lidar system 308 are the light source 404 and the receiver 444. A positioning system 200 in accordance with at least some embodiments of the present disclosure, for example as illustrated in FIG. 4A, can utilize the light source 404 and the scanning device 424 of the lidar device 308 to generate a visible target 204. In accordance with other embodiments of the present disclosure, for example as illustrated in FIG. 4B, a positioning system 200 can include a separate projection system 406 having a projector light source 450 and projector scanning device 452 for generating a visible target 204. In another embodiment a scanning device 452 is not required as the projector light source can be a 2-D projector like a standard projector system. The light can be passed through a projector window 456, or through the window 428 provided for the lidar system 308. In accordance with at least some embodiments, the light source 404 of the lidar system 308 can be operated in combination with a separate projector light source 450 to project a visible target 204. For instance, the projector light source 450 may provide light in one or more colors that are not available from the light source 404 included as part of the lidar system 308.

Embodiments of the present disclosure can include all of the components illustrated in FIGS. 4A and/or 4B, additional or alternate components, or a subset of these components. In accordance with embodiments of the present disclosure, the range and angle measurements should all be compensated using techniques described in U.S. Pat. Nos. 8,184,276 and 8,467,044. The memory 464 can be used for storing the location information, operating instructions, generated data, and the like. An input/output or communication interface 468 can be included for transmitting determined information to a monitoring and control station 504 (see FIG. 5) or other system or control center in real-time, near real-time, or asynchronously. A power source and distribution bus 472 can also be integrated with the positioning system 200. Various elements of a positioning system 200 as disclosed herein can be provided as or by discrete or integrated components. For example, various optical elements of the lidar system 308 can be formed on a substrate that is bonded to the semiconductor substrate in which the receiver 444 is formed, creating an integrated chip or package.

Figure 5:
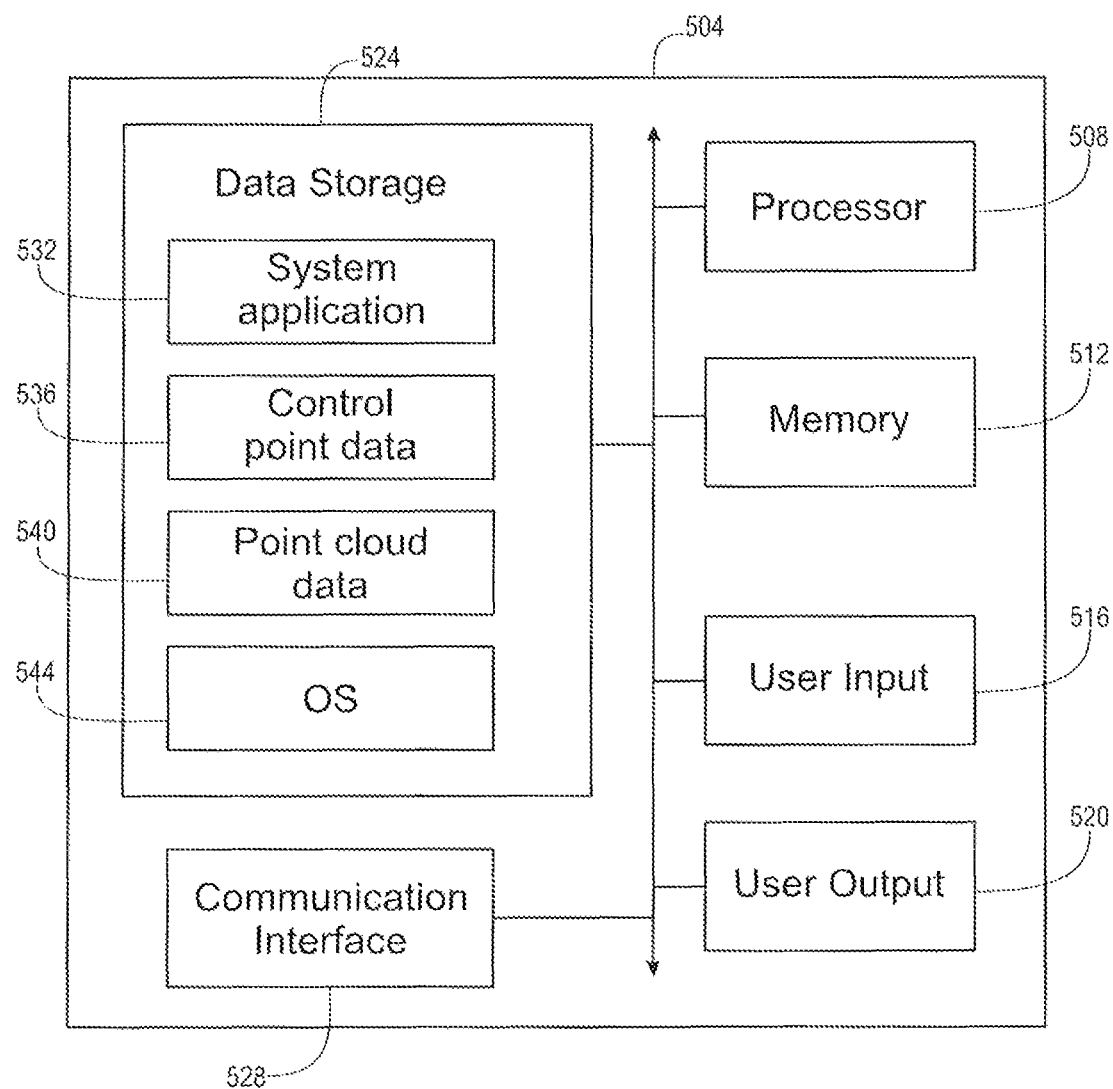
FIG. 5 is a block diagram depicting a monitoring and control station in accordance with embodiments of the present disclosure.

FIG. 5 is a block diagram depicting human interface and other components that can be provided as part of or in conjunction with a monitoring and control station 504 associated with an underwater positioning system 200 in accordance with embodiments of the present disclosure. The monitoring and control station 504 can be provided as a top-side facility, carried by a mobile platform, such as a surface ship or a submersible vehicle, mounted to a fixed or stationary platform, such as a production platform, or located at an on-shore facility. The monitoring and control station 504 facilitates or performs functions that include providing output to and receiving input from a user or from an automated processing center. The monitoring and control station 504 generally includes a processor 508 and memory 512. In addition, the monitoring and control station 504 can include one or more user input devices 516 and one or more user output devices 520. The monitoring and control station 504 also generally includes data storage 524. In addition, a communication interface 528 can be provided, to support interconnection of the monitoring and control station 504 to the underwater components of the positioning system 200, and/or to other systems. This interface 528 can be used as a command and control interface to another autonomous device that provides the inputs and reads outputs that replaces human user interfaces 516 and 520.

The processor 508 may include a general purpose programmable processor or any other processor capable of performing or executing instructions encoded in software or firmware. In accordance with other embodiments of the present disclosure, the processor 508 may comprise a controller, FPGA, or ASIC capable of performing instructions encoded in logic circuits. The memory 512 may be used to store programs and/or data, for example in connection with the execution of code or instructions by the processor 508. As examples, the memory 512 may comprise RAM, SDRAM, or other solid-state memory. In general, a user input device 516 is included as part of the monitoring and control station 504 that allows a user to input commands, including commands that are transmitted to the underwater components of the overall monitoring system, to control aspects of the operation of the positioning system 200. Examples of user input devices 516 that can be provided as part of the monitoring and control station 504 include a keyboard, keypad, microphone, biometric input device, touch screen, joy stick, mouse, or other position encoding device, or the like. A user output device 520 can, for example, include a display, speaker, indicator lamp, or the like. Moreover, a user input device 516 and a user output device 520 can be integrated, for example through a graphical user interface with a pointing device controlled cursor or a touchscreen display. Like the memory 512, the data storage 524 may comprise a solid-state device. Alternatively or in addition, the data storage 524 may comprise, but is not limited to, a hard disk drive, a tape drive, or other addressable storage device or set of devices. Moreover, the data storage 524 can be provided as an integral component of the monitoring and control station 504, or as an interconnected data storage device or system.

The data storage 524 may provide storage for a subsea monitoring system application 532 that operates to present a graphical user interface through the user output device 520, and that presents point cloud data, or data derived from point cloud data, obtained by a positioning system 200. The application 532 can further operate to receive control commands from a user through the user input device 516, including commands selecting target areas or other control points in an underwater scene. In accordance with embodiments of the present disclosure, the application 532 can perform various functions autonomously, such as identifying underwater objects, identifying features on underwater objects 208, identifying a centroid of an underwater object or a feature of an underwater object, identifying control points on underwater objects, identifying target centroids, monitoring the motion, vibration, and/or temperature parameters of underwater objects, or other operations. Such automated operations can be implemented using, for example, image recognition techniques. The data storage 524 can additionally provide storage for the selected control points 536, for point cloud data 540 generated by operation of a positioning system 200, and for range, vibration, vibration mode, temperature, leak detection, or other measurements or data generated by a positioning system 200. In accordance with still other embodiments of the present disclosure, the system application 532 can be executed to detect motion, vibration, vibration mode, temperature, changes, features, lack of features, other anomalies, or leaks instead of or in conjunction with execution of the system software 463 by the processor 448 of the positioning system 200. The data storage 524 can also store operating system software 544, and other applications or data.

Figure 6:
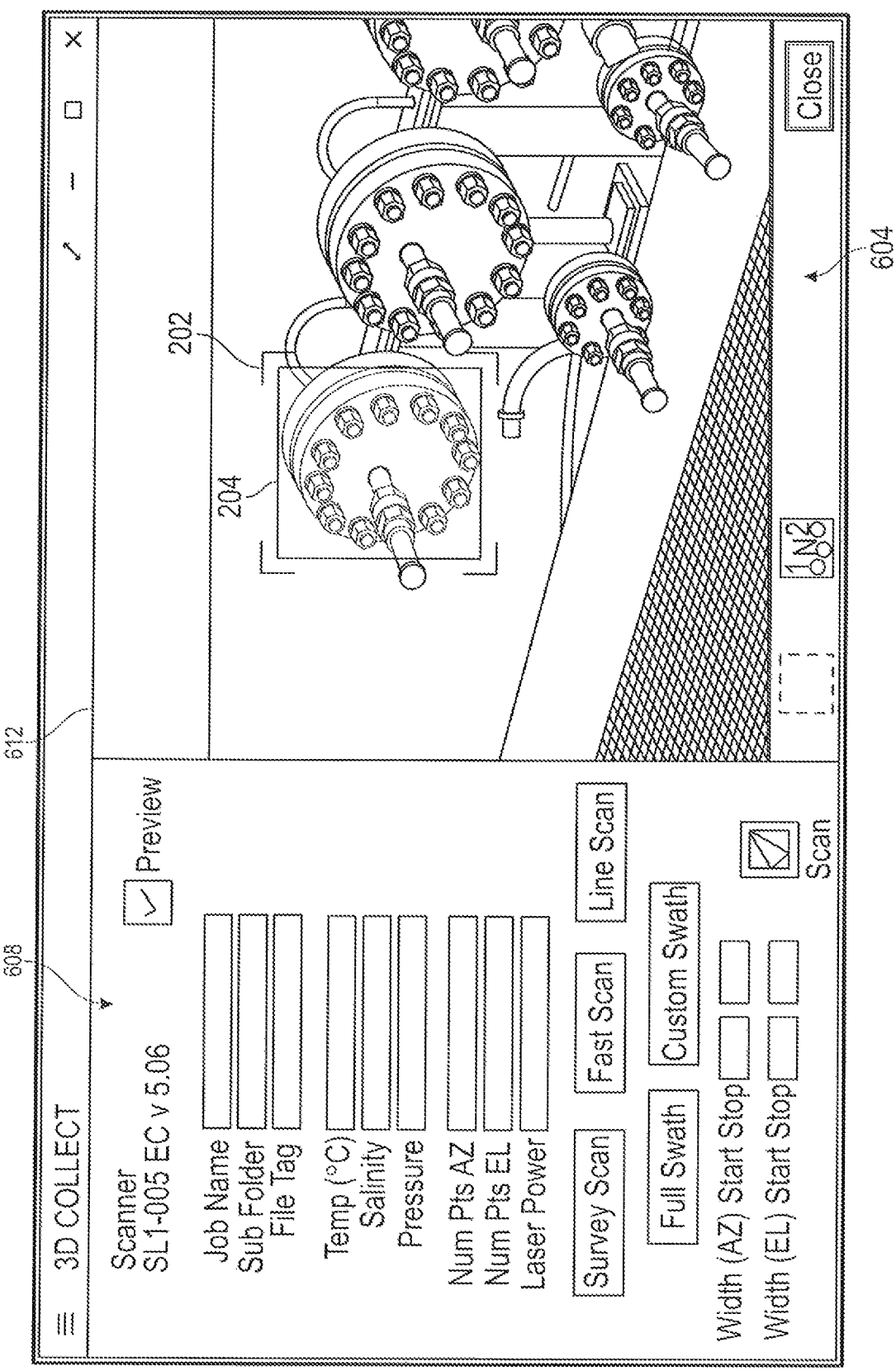
FIG. 6 depicts a user interface presented in connection with the operation of a system in accordance with embodiments of the present disclosure.

An example of a user interface 604 presented to a user by a user output device 520 is depicted in FIG. 6. As shown, the user interface 604 can include a user input section 608 containing a variety of data entry fields and virtual buttons that can be utilized by a user to enter control instructions or data through manipulation of one or more user input devices 516. The user interface 604 can additionally present an image 612 of the underwater scene generated from the point cloud data obtained by the initial scan of the scene. The image can include point cloud data obtained from a single lidar device 308, or that has been stitched together from multiple lidar devices 308. The image could also be a subset or derivative of the point cloud data, such as just the intensity information, or a 2-D image. In addition, the image can include a depiction or a 2-D image, such as a video image, of a projected target 204 associated with a target area 202 for an object 208. Accordingly, the user interface 604 in cooperation with a camera 328 can comprise a video system.

In accordance with at least some embodiments of the present disclosure, the location of the target area 202 and the projected target 204 can be modified by the user through the user input devices 516. Accordingly, the establishment of a target area 202 can involve a manual operation, in which a user or operator determines the target area 202 with reference to the presented image 612. As an alternative, the determination as to whether the intended underwater structure is included in the scene can be performed through automated processes, such as through the execution of image recognition software included in or provided separately from the system application 532. The user interface can include visual and audible indicators and guides as the object 208 approaches the target area 202, such as directional arrows, approach velocity, warning indicators, range, heading, error or deviation, depth, temperature, or any other data or directional guidance.

Figure 7:
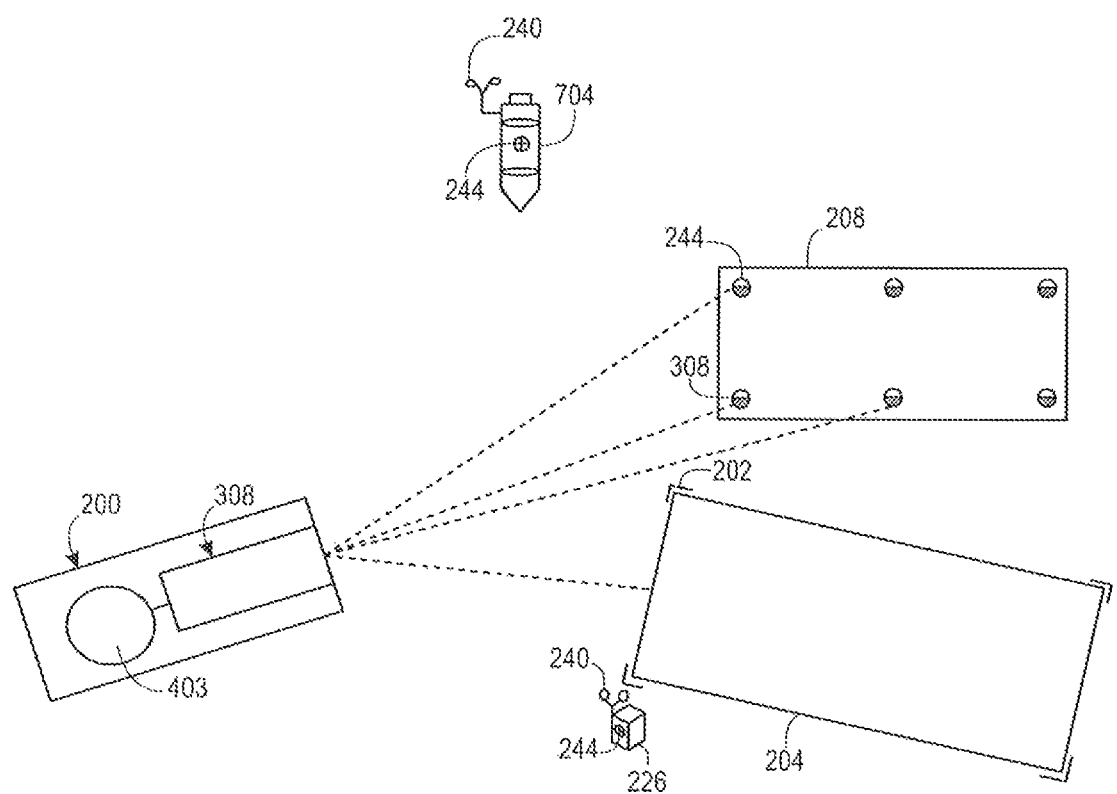
FIG. 7 depicts an undersea scenario including the monitoring of a location of an object and the projection of a visible target by a positioning system in accordance with embodiments of the present disclosure.

FIG. 7 depicts an undersea scenario including the projection of a visible target or image 204, in this example in the form of a target box, by a positioning system 200 in accordance with embodiments of the present disclosure. The positioning system 200 can be placed on a support structure placed on the seabed, carried by an ROV or AUV that is stationary on the seabed, carried by an ROV or AUV that is floating in a station-keeping mode, or otherwise carried or placed in the vicinity of the target area 202 for an object 208. Information regarding the location of the positioning system 200 can be provided by the INU 403. Alternatively, or in addition, the positioning system 200 can obtain information regarding its location by referencing one or more geo-located monuments 226 or other stationary structures on the seabed, or even by the seabed features themselves. Location information obtained relative to the geo-location monuments 226 can replace or be supplemented by the known location of the monitoring system 200, obtained, for example, from an INU 403, or other stationary structures on the seabed such as manifolds 128, wells 130, or suction piles 136, or even by the seabed features themselves. By determining the desired target location 202 relative to the known location of the positioning system 200, the positioning system 200 can project the target indicia 204 such that it corresponds to, lies within, or otherwise indicates, through a visually perceptible signal, the desired target location 202. The visible target 204 does not have to be a "box" but can be any visually perceptible signal of use to the operator of the emplacement equipment 210.

The positioning system 200 can also monitor the location and orientation of the object 208 as it is being brought towards and placed at the target location 202. This monitoring of the object 208 can be facilitated through the placement of reference targets 244 on the object 208. As discussed in greater detail elsewhere herein, the reference targets 244 can identify an associated object 208, a side of the object 208, and angle of the object 208 relative to the positioning system 200. In a further embodiment the object 208 could be a pipe or cable laydown. In a still further embodiment the reverse can be performed where positioning system 200 is mounted on the object 208 and monitors its location relative to monuments 226 or other stationary structures such as manifolds 128, wells 130, or suction piles 136, for example, having known locations. In still further embodiments the object 208 can be a moving object such as an ROV or AUV. The positioning information collected by monitoring system 200 can be fed back to an operator of the ROV, or to the automated control system of an AUV. The improved position and heading information can increase the accuracy and decrease the risk of close-up operation to expensive equipment such as valve operation and automated docking.

In addition to aiding with the positioning of the object 208, at least some embodiments of the positioning system 200 can measure and report the final touchdown speed, along with the final location (x,y,z, heading, pitch, and roll) of the object 208, and how much these vary from the ideal target location 202. Along with this final location reporting, the seabed around the structure can be scanned for "as deployed" condition, which can be compared to future scans for scour detection or dredging.

FIG. 7 also depicts the use of an acoustic transponder 704 and a geo-located monument 226 in accordance with embodiments of the present disclosure. The positioning system 200 may reference the geo-located monument 226 to determine a relative position of the positioning system 200 and/or the acoustic transponder 704. As shown, the geo-located monument 226 can include indicia, such as a two-dimensional 244 and three dimensional 240 targets, to assist in determining the location of the positioning system 200, and in turn objects 208 and or target locations 202, relative to the geo-located monument 226. In accordance with further embodiments of the present disclosure, the indicia can include information uniquely identifying an associated geo-located monument 226. The acoustic transponder 704 may comprise a conventional acoustic transponder that has been modified to include indicia. Indicia associated with an acoustic transponder 704 may comprise reference targets 240, 244 that can be used as control points for determining a relative location of the acoustic transponder 704. In accordance with further embodiments of the present disclosure, the indicia can include information uniquely identifying an associated acoustic transponder 704.

Figure 8:
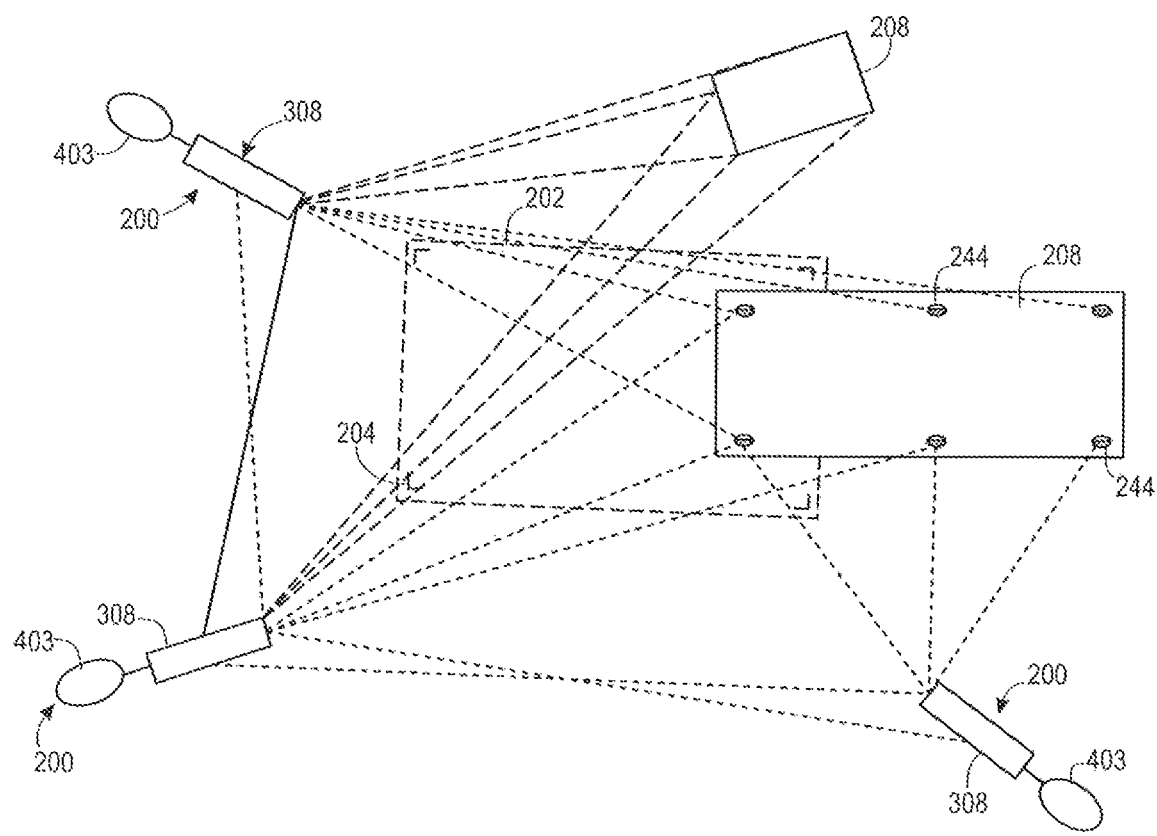
FIG. 8 depicts an undersea scenario including the monitoring of locations of multiple objects and the projection of visible targets by multiple positioning systems in accordance with embodiments of the present disclosure.

FIG. 8 depicts an undersea scenario including multiple positioning systems 200 monitoring a position of an object 208 in accordance with embodiments of the present disclosure. Each positioning system 200 may be geo-located, and each may determine a relative location of the object 208. The location information determined by a positioning system 200 regarding its location, the location of the object 208, the location of another positioning system 200, or the location of any other underwater object 208 or feature may be shared with other positioning systems 200. The use of multiple positioning systems 200 can provide redundancy, and can provide enhanced location accuracy, at least under some conditions. A visible target 204 can be projected by one or more than one of the positioning systems 200. In addition, as in other embodiments, the location information regarding the object 208 can be fed back to the operator of the lift, crane, vehicle, or other equipment being used to position the object 208. Moreover, a positioning system 200, or multiple positioning systems 200, can track multiple objects 208 simultaneously or nearly simultaneously, for example by scanning a first one of the objects to determine a current position of that object 208, scanning a second object 208 to determine a current position of that object, and so on, before returning to scanning the first object 208. Moreover, a visible target 204 can be projected by a positioning system 200, or by multiple positioning systems 200, for the additional object 208. Also, where multiple positioning systems 200 are used to track multiple objects 208, information regarding the position of an object 208 determined by one of the positioning systems 208 can be shared with other positioning systems 200.

Figure 9:
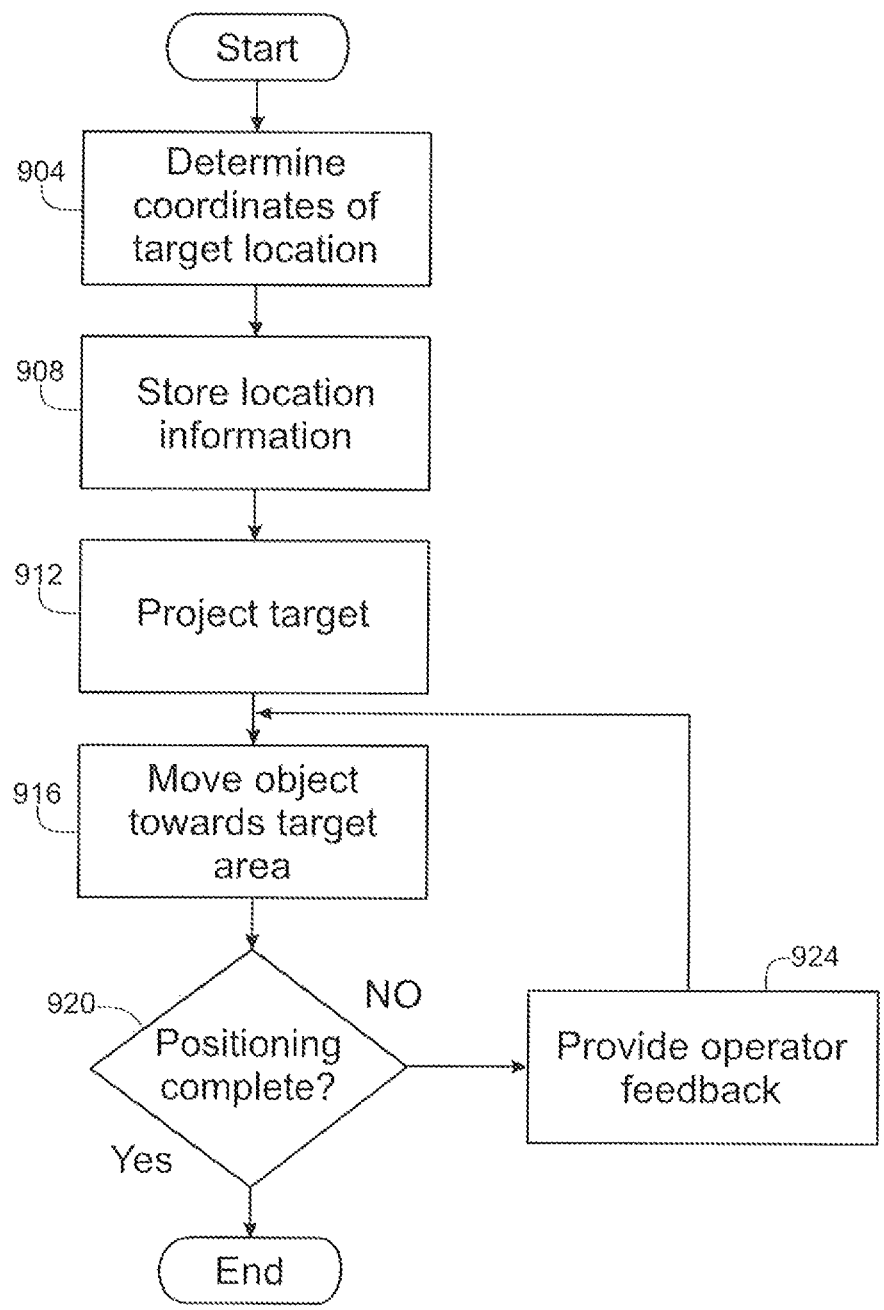
FIG. 9 is a flowchart depicting aspects of a process for positioning an object in an underwater target location in accordance with embodiments of the present disclosure.

Aspects of a method for providing a visible target 204 to an operator of emplacement equipment 210 for use in placing an object 208 in a target location 202 are depicted in FIG. 9. Initially, at step 904, the coordinates or other geolocation information of a target area 202 for an object is determined. This can include receiving coordinates in the form of a latitude and longitude, ranges and/or angles relative to a monument 226, or other know location. Alternatively, the location of the target area 202 can be obtained through input from an operator received through a user input 516. At step 908, the geolocation information is stored in memory 464.

A projected target 204 is then produced by the positioning system 200 (step 912). In accordance with embodiments of the present disclosure, the projected target 204 is produced to outline all or selected portions of the target area 202. The projected target 204 can be generated with reference to characteristics of the object 208 being placed in the target area 202. For example, if the object 208 includes a tripod support structure, the projected target 204 can include an outline of the desired locations for each foot of the tripod. In accordance with at least some embodiments of the present disclosure, the positioning system 200 can provide information in addition to a line or other indicia marking a target area 202. For instance, the positioning system 200 can continuously or periodically monitor the location of the object 208 relative to the target area 202, and can provide relevant information regarding the alignment, velocity, or other information to the operator of the emplacement equipment 210. In addition to data, the information can include directional guidance, for example in the form of one or more directional arrows. Moreover, such arrows can vary in length, for example to indicate a distance from the target area 202. As a further example, curved or otherwise non-linear arrows can be projected to indicate a preferred path for the object 208 to follow. This information can be provided through indicia projected onto the seafloor, onto the object 208 itself, or onto underwater structures in the vicinity of the object 208 and/or the target area 202. For instance, additional information can be projected within and/or adjacent an area encompassed by the projected target 204.

In accordance with further embodiments of the present disclosure the projected target is virtual. In this virtual world the positioning system 200 operates to track the true relations between the target area 202 and the object 208, and to present a virtual depiction of the target area 202, the target indicia 244 and/or the object 208. This virtual information could be displayed by a screen of an output device 520 included as part of the user interface 504, and could be used, for example, by a crane operator watching the screen while placing the object 208 within the target area 202.

At step 916, the object 208 is moved to the target area 202. Next, a determination can be made as to whether positioning the object 208 in the target area 202 has been completed (step 920). In accordance with at least some embodiments of the present disclosure, this can include the positioning system 200 scanning the object 208 to verify that the object 208 is within the target area 202. Moreover, the positioning system 200 can verify that the object 208 has a desired orientation or is otherwise correctly positioned. In accordance with still other embodiments, the determination as to whether placing the object 208 within the target area 202 is complete can be performed manually by an operator, for example by comparing the position of the object 208 relative to the visible target 204 projected by the positioning system 200. In further embodiments, if positioning of the object 208 is not complete (920) then operator feedback (step 924) is generated to assist with the next step 916. Operator feedback can include directional arrows or guides projected onto an underwater object or feature, and/or can be displayed by the user interface 604. It could also include live feedback of position, heading, approach velocity, and other information. It can also include proximity or collision detection warnings. If positioning of the object 208 has been completed, the process can end.

Figure 10:
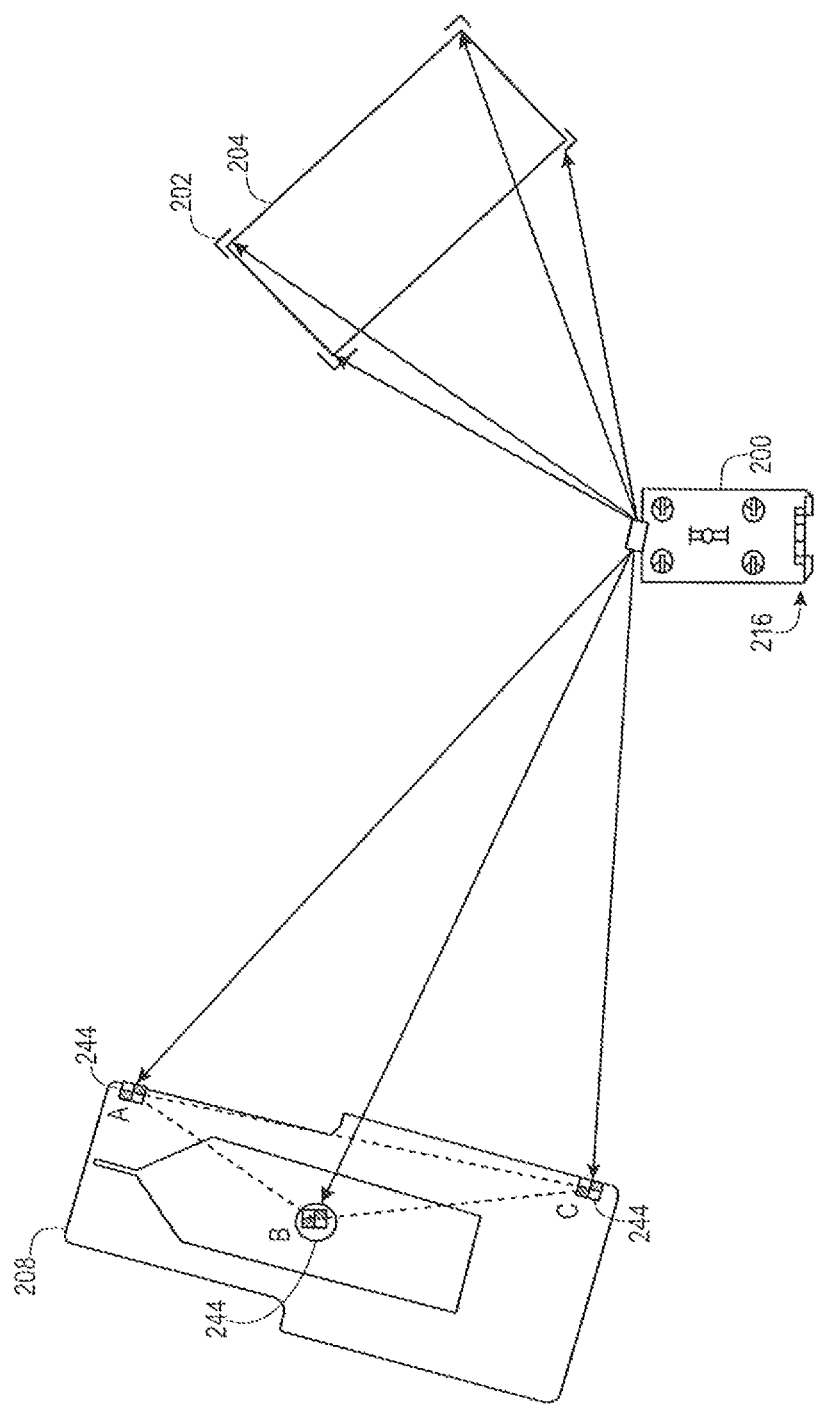
FIG. 10 depicts an undersea scenario including the monitoring of a location of an object and the projection of a visible target by a positioning system in accordance with other embodiments of the present disclosure.

With reference now to FIG. 10, another undersea scenario including the projection of a visible target or image 204 by a positioning system 200 in accordance with embodiments of the present disclosure is depicted. In this example, the object 208 being positioned has at least three previously coordinated reference points or targets 244, shown as points A, B, and C in the figure. The positioning system 200, in this example carried by an underwater vehicle 216 in the form of an ROV, is placed at a location from which the targets 244 on the object 208 are visible, and from which the target area 202 for the object 208 is visible, to enable the positioning system 200 to project a visible target 204.

Figure 11:
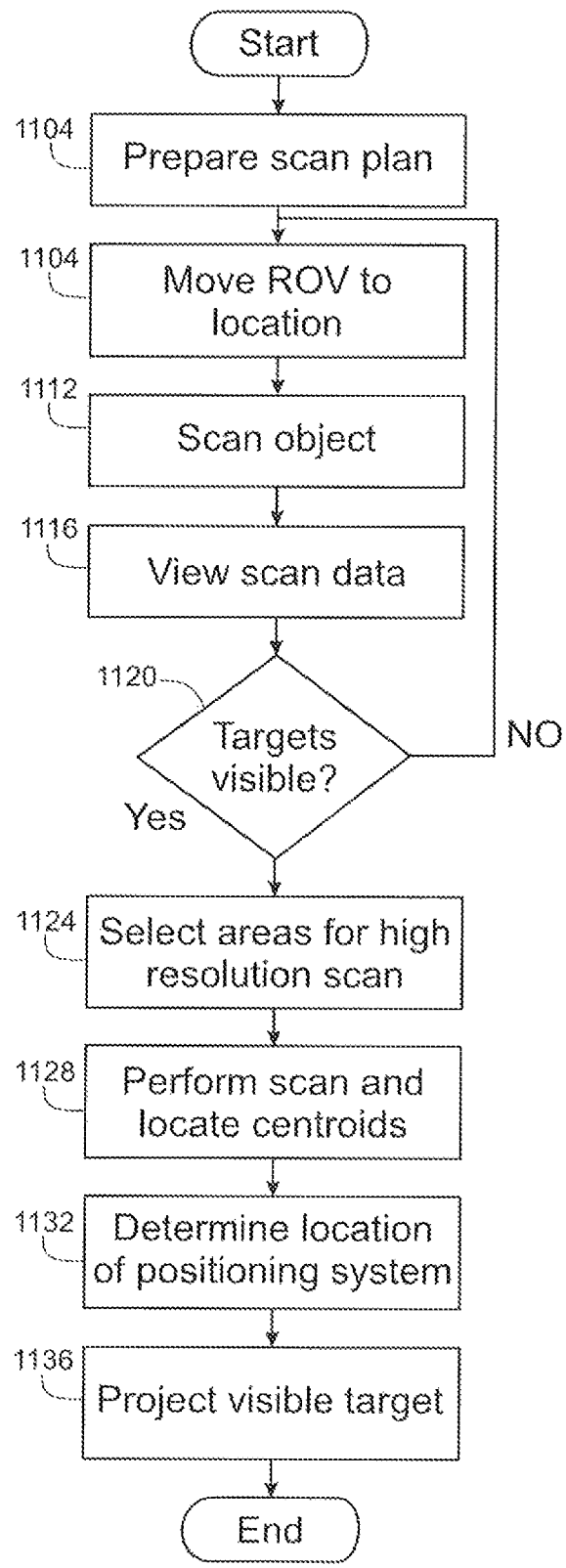
FIG. 11 is a flowchart depicting aspects of a process for positioning an object in an underwater target location in accordance with other embodiments of the present disclosure.

Aspects of a method for placing an object 208 in a target area 202 in a scenario such as depicted in FIG. 10 are shown in FIG. 11. Initially, at step 1104, a scan plan is determined. The scan plan can include determining a location at which the ROV carrying the positioning system 200 should be placed in order to have a view of the object 208 being positioned and the target area 202 for the object 208. The ROV 216 can then be moved to the predetermined location (step 1108). From that predetermined location, the positioning system 200 is operated to scan the object 208 (step 1112). An operator can view the scan data (step 1116), for example as presented by a user interface 604, to determine whether the targets 244 on the object 208 are visible (step 1120). In accordance with further embodiments, determining whether the targets 244 are visible to the positioning system 200 can be performed by an automated image recognition process running on the positioning system 200 itself, on a related monitoring and control station 504, or on some other device or system.

If it is determined at step 1120 that the location at which the underwater vehicle 216 has been placed does not enable a view of the targets 244, the process can return to step 1108, and the underwater vehicle 216 can be repositioned. If the location is good, and the targets 244 are in view, an area or areas in which a high resolution scan is performed is selected (step 1124). The selection of an area for a high resolution scan can be made by a human operator selecting the area through a user interface 604, or through an automated process.

A high resolution scan of the selected area is then performed, and the centroids of the targets 244 within the scanned area are located (step 1128). The locating of the centroids of the targets 244 can be performed by an image recognition process running on the processor 448. The location of the positioning system 200 can then be determined (step 1132). As an example, the location of the positioning system 200 relative to the object 208 can be determined by performing a three point resection traverse, in which the location of the positioning system is calculated from the determined angles subtended by lines of sight from the positioning system 200 to the three previously coordinated targets 244. Moreover, where the object 208 is itself geolocated, determining the location of the positioning system 200 relative to the object 208 allows the positioning system 200 to itself be geolocated. The positioning system 200 is then controlled to project a visible target 204, indicating the target area 202 for the object 208 (step 1136).

The visible target 204 can continue to be projected until the object 208 has been placed within the target area 202. The process can then end.

Figure 12:
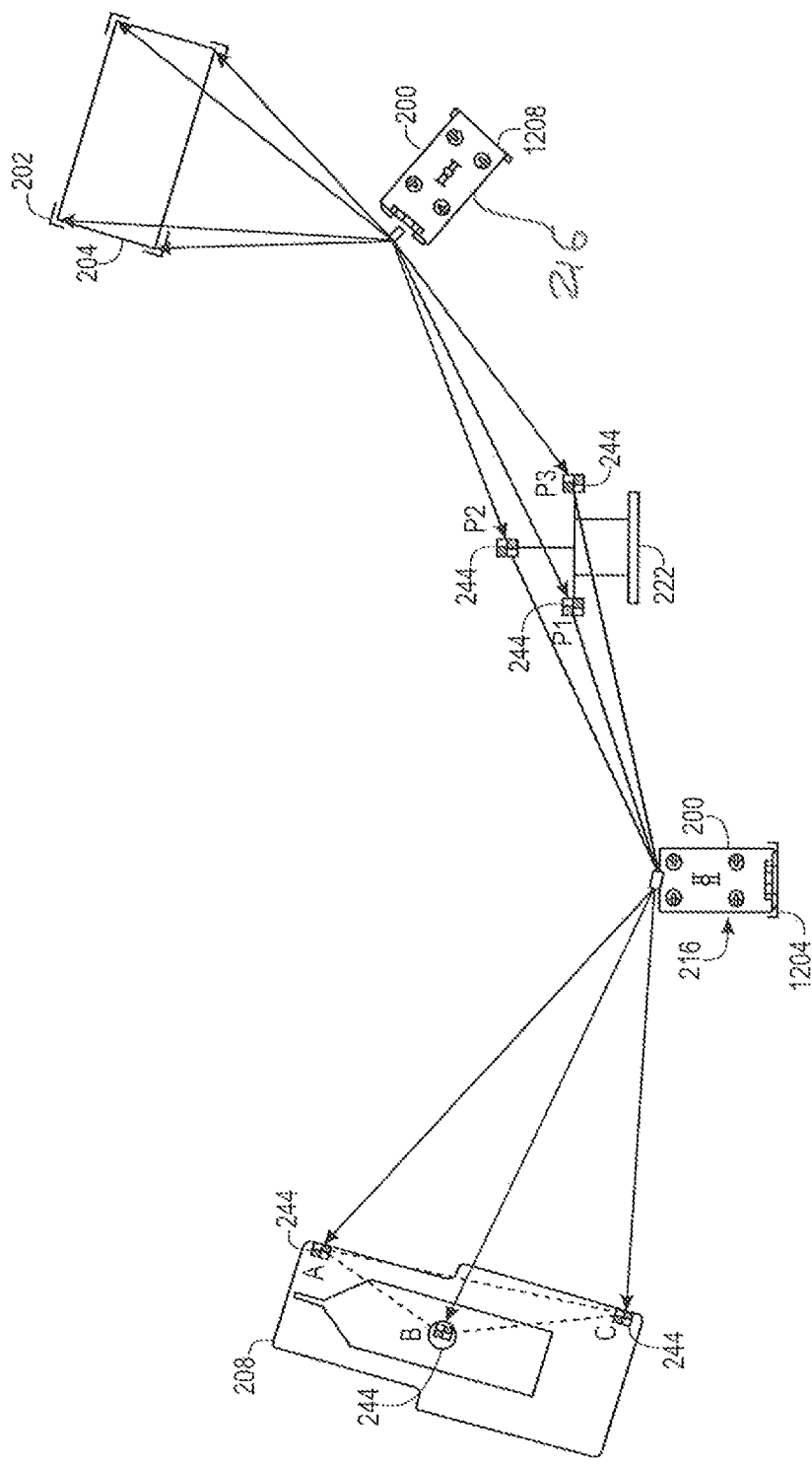
FIG. 12 depicts an undersea scenario including the monitoring of a location of an object and the projection of a visible target by a positioning system in accordance with other embodiments of the present disclosure.

With reference now to FIG. 12, still another undersea scenario including the projection of a visible target or image 204 by a positioning system 200 in accordance with embodiments of the present disclosure is depicted. In this example, the object 208 being positioned has at least three previously coordinated reference points or targets 244, shown as points A, B, and C in the figure. In addition, a target stand 222 (or multiple stands) having a plurality of targets 244, denoted as targets $P_1$, $P_2$, and $P_3$, affixed thereto, is included. The positioning system 200, for example carried by an underwater vehicle 216 in the form of an ROV, is initially placed at a first location 1204 from which the targets 244 on the object 208 are visible, and from which the targets 244 on the target stand 222 are visible. The ROV carrying the positioning system 200 can then be moved to a second location 1208 from which the target area 202 for the object 208 is visible, to enable the positioning system 200 to project a visible target 204.

Figure 13:
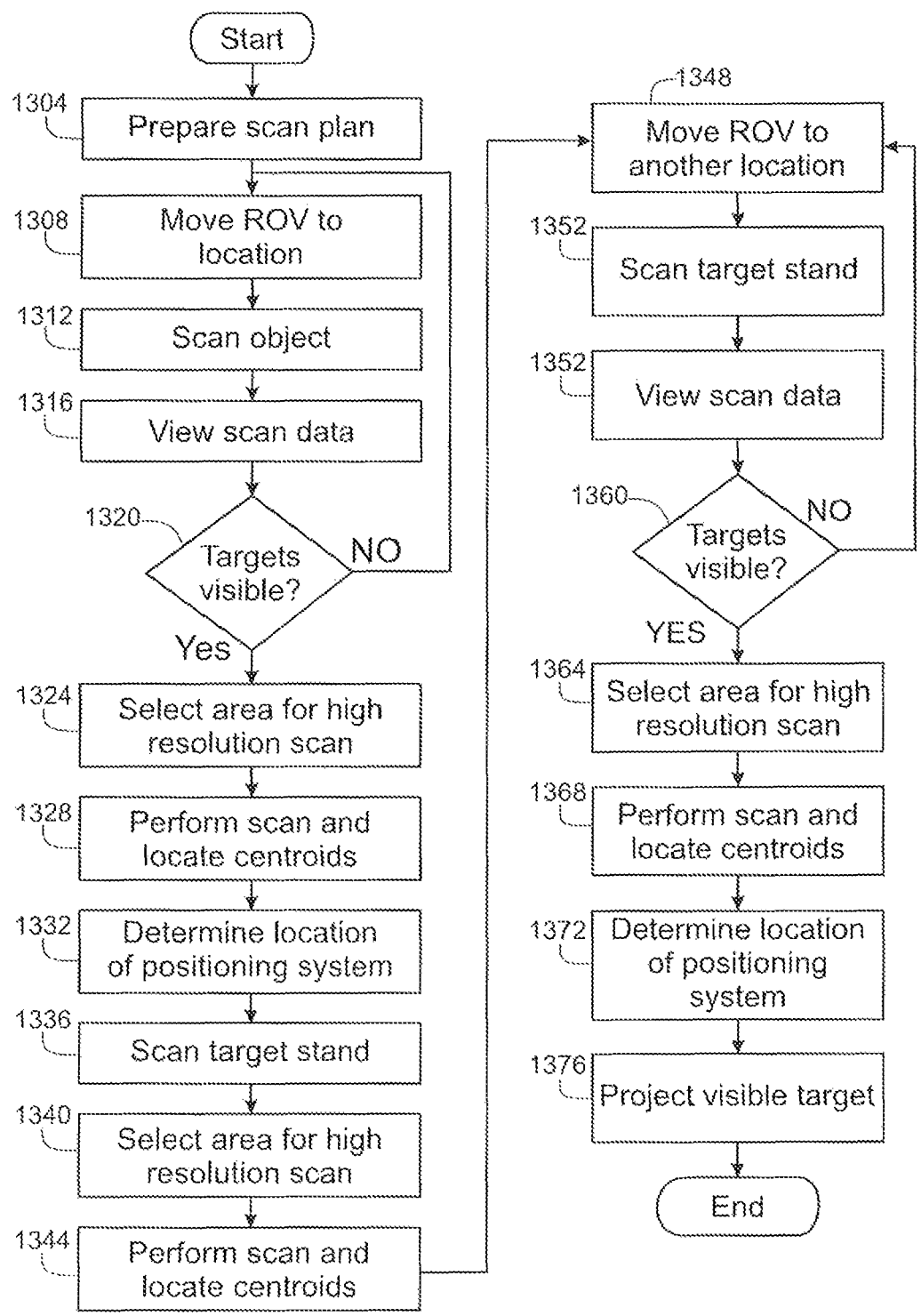
FIG. 13 is a flowchart depicting aspects of a process for positioning an object in an underwater target location in accordance with other embodiments of the present disclosure.

Aspects of a method for placing an object 208 in a target area 202 in a scenario such as depicted in FIG. 12 are shown in FIG. 13. Initially, at step 1304, a scan plan is determined. The scan plan can include generally determining a first location at which the ROV carrying the positioning system 200 should be placed in order to have a view of the object 208 being positioned and of a target stand 222 located in the vicinity of the object 208, and a further location at which the ROV carrying the positioning system 200 should be placed in order to provide a view of the target area 202 for the object 208. The ROV 216 can then be moved to the first predetermined location, from which the object 208 is or should be visible (step 1308). From that first location, the positioning system 200 is operated to scan the object 208 (step 1312). An operator can view the scan data, for example as presented by a user interface 604 (step 1316), or an automated process provided with the scan data can be executed, to determine whether the targets 244 on the object 208 are visible (step 1320). If the targets 244 are not in view, the process can return to step 1308, and the underwater vehicle 216 can be repositioned. If the location is good, and the targets 244 are in view, an area or areas in which a first high resolution scan is performed is selected (step 1324). The selection of an area for a high resolution scan can be made by a human operator selecting the area through a user interface 604, or through an automated process.

A high resolution scan of the selected area is then performed, and the centroids of the targets 244 within the scanned area are located (step 1328). The locating of the centroids of the targets 244 on the object 208 can be performed by an image recognition process running on the processor 448. The location of the positioning system 200 can then be determined (step 1332). As an example, the location of the positioning system 200 relative to the object 208 can be determined by performing a three point resection traverse. Moreover, where the object 208 is geolocated, determining the location of the positioning system 200 relative to the object 208 allows the positioning system 200 to itself be geolocated.

At step 1336, the positioning system 200 is operated to scan the target stand 222 from the first location. An operator viewing the data or an automated system can then select an area encompassing the targets 244 on the target stand 222 (step 1340), and a high resolution scan of the selected area can then be performed, from which the locations of the target 244 centroids can be determined (step 1344), thereby allowing those targets 244 to be geolocated. At step 1348, the positioning system 200 is moved to a second location, for example by repositioning the ROV carrying the positioning system 200. The target stand 222 is then scanned (step 1352). An operator or an automated system can then view the scan data (step 1356), to determine whether the targets 244 on the target stand 222 are visible (step 1360). If the targets 244 are not in view, the process can return to step 1348, and the underwater vehicle 216 can again be repositioned. If the location is good, and the targets 244 are in view, an area or areas in which a first high resolution scan is performed is selected (step 1364). The selection of an area for a high resolution scan can be made by a human operator selecting the area through a user interface 604, or through an automated process.

A high resolution scan of the selected area is then performed, and the centroids of the targets 244 on the target stand 222 are located (step 1368). The locating of the centroids of the targets 244 on the target stand 222 can be performed by an image recognition process running on the processor 448. The location of the positioning system 200 can then be calculated from the previously determined locations of the targets 244 on the target stand 222 (step 1372), for example by performing a three point resection traverse. As can be appreciated by one of skill in the art after consideration of the present disclosure, additional target stands 222 can be used to enable an object 208 to be moved a relatively large distance from a first known location to a target area 202, even in turbid water conditions. The positioning system 200 is then controlled to project a visible target 204, indicating the target area 202 for the object 208 (step 1376). The projection of the visible target 204 can be continued until the object 208 is positioned within the target area 202.

As described herein, a positioning system 200 can incorporate a lidar system 308 that is implemented as a single spot sensor system, such as a scanning lidar, or a lidar that receives and senses returns from multiple points within a scene simultaneously. In a single spot sensor system, measurements from different points within a scene can be made at virtually the same time, by sequentially pointing the lidar system 308 of the positioning system 200 at different points within the scene in an automated fashion. In a flash sensor system, measurements from different points within a scene can be made at the same time (i.e. multiple measurements can be obtained from returns generated from a single pulse of light), with returns received at different pixels within the sensor corresponding to different azimuth angles and elevation angles relative to the lidar system 308. The positioning system 200 can be mounted on an ROV, AUV, tripod, monument, cage, or other subsea structure. In at least some embodiments, a cage or frame 224 of a positioning system 200 can itself comprise an underwater structure 304 and can provide a platform with numerous selectable functions. This can include the incorporation of batteries and a power control system that allows for long-term autonomous deployment. The positioning system 200 can also provide additional capabilities, including, but not limited to, data storage and backup, temperature sensors, depth sensors, salinity sensors, other chemical sensors, and communication devices. The positioning system 200 can also provide timing signals between multiple sensors to time synchronize the data collection of those sensors. Examples of communication devices include wired electrical or optical systems, a radio frequency, free space optical, or acoustic devices. Communications can be with ROVs, AUVs, resident vehicles, other intelligent structures in the field, or the surface. The positioning system 200 can store data, compress and send out data samples, or auto process data to look for change detection and send alarms signals when change is detected. Moreover, a positioning system 200 can provide power, data storage, and communications capabilities to other monitoring devices or positioning system 200, for example to allow for monitoring at different angles or over an increased field of view. Alternatively, or in addition, the positioning system 200 can be connected to the local infrastructure for power and/or communications.

In at least some embodiments of the present disclosure, a human operator or user interacts with the positioning system 200 through a monitoring and control station 504 that is in operative communication with the positioning system 200. The user can control the field of regard of the positioning system 200 by entering control commands through a user input 516 to direct a movable platform or vehicle 216 carrying the positioning system 200, and/or to direct a pan and tilt head to which a lidar system 308 or the positioning system 200 itself is mounted. In addition, real time or near real-time feedback regarding the field of regard of the positioning system 200 can be provided to the user through the user output 520. Moreover, the feedback provided by the user output 520 can be in the form of a two-dimensional image obtained by a camera 328, a visualization of point cloud data obtained by a lidar system 308, or a synthesis of two-dimensional and three-dimensional data.

In accordance with still other embodiments of the present disclosure, a positioning system 200 can operate autonomously or semi-autonomously. For example, in an autonomous mode, the positioning system 200 can scan a scene to obtain point cloud data of an area encompassing a target area 202 and can execute software to generate a projected target 204 to provide a visual indication of the target area 202, to assist an operator in accurately placing an object 208 in the target area. In a semi-autonomous mode, a user can provide direction to the positioning system 200, such as manually defining the location or other characteristics of the projected target 204.

Where multiple positioning systems 200, or where multiple monitoring 304 and/or projection systems 406 are employed, information from some or all of the multiple systems can be synthesized in a common control center or in an underwater component of the system. Also in embodiments in which multiple positioning systems 200 are included, some or a plurality of the positioning systems 200 can be operated to project a visible target 204 to aid in the placement or guidance of equipment or other objects 208. In this scenario, for example as depicted in FIG. 8, multiple positioning systems 200 could start by monitoring the location of the same object 208 in order to improve the location and heading estimates of the object 208. One can then determine by trial and error or by algorithm which positioning system or systems 200 are providing the most accurate data due to their perspective orientation relative to the object 208. The remaining positioning system or systems 200 can then be dedicated as the projection system 406. This division of tasks between positioning systems 200 can be modified as the object 208 approaches the target location 202. Alternatively, or in addition, a dedicated projection system 406 that receives location information from a monitoring system 304 can be included. In accordance with still other embodiments of the present disclosure, targets, such as the 2-D targets 244, three-dimensional spherical targets 240, prisms, or other target indicia or structures can be attached to underwater objects 208, target stands 222, or monuments 226 and can be detected by the positioning system 200 for use in obtaining absolute and/or relative location information.

Embodiments of the present disclosure can additionally utilize multiple monitoring system 304 and/or projection system 406 components simultaneously. For example, multiple, geo-located, monitoring systems 304 can be used to provide information regarding the location and heading of a subsea object 208. Each monitoring device 304 can share information regarding its own geolocation with the other monitoring devices 304 to provide redundancy and high accuracy. Alternatively, a positioning system 200 or a monitoring system 304 with a known geolocation can provide location information to another positioning system 200 or monitoring system 304. In accordance with still other embodiments of the present disclosure, a monitoring system 304 can be operated to take a plurality of range, intensity, and angle, angle measurements from a monitored subsea object, and can average those measurements, to provide a higher level of accuracy as compared to measurements taken using a single or smaller number of scans. In addition, multiple projection systems 406 can be used to ensure that an unobstructed visible target is presented to an operator of emplacement equipment.

As can also be appreciated by one of skill in the art after consideration of the present disclosure, various functions can be distributed amongst different components of a positioning system 200 or different connected systems or devices. For example, the processor 448 located within an underwater pressure vessel 402 of a positioning system 200 can execute application software 463 that controls an associated lidar device 308 to obtain raw point cloud data comprising azimuth angle, elevation angle, range, intensity, and timestamp information. The information generated by such onboard processing can then be transmitted by the communications interface 468 to a monitoring and control station 504. Alternatively or in addition, onboard processing performed by the positioning system 200 can provide automatic notifications or alarms that are transmitted to the monitoring and control station 504 or other facility. The monitoring and control station 504 receives the point cloud data, notifications, alarms, or other information transmitted by the positioning system 200 through a communication interface 528, and stores the point cloud data 540 in data storage 524. The processor 508 can then execute system application software 532 to present a visualization of the point cloud data through a user output device 520. The processor 508 can further execute system application software 532 to receive input from the user regarding the generation of a projected target 204 that is passed to the positioning system 200. In accordance with still other embodiments of the present disclosure, processing of point cloud data can be performed by the monitoring system 304 itself, by servers or control stations provided in place of or in addition to the monitoring and control station 504, or in various combinations.

Optical targets can be affixed to undersea structures to enhance the identification and locating of such structures by a monitoring device. The optical targets can be two or three dimensional. In addition, different targets can have different optical characteristics, to allow the different targets is to be distinguished from one another by the monitoring device. The optical targets can vary characteristics of the light that is reflected back to the monitoring device. Such characteristics can include the intensity, pattern, frequency, phase, or polarization of the light. In addition, the targets can encode information using barcodes, holograms, human perceptible indicia, or the like.

Particular examples of applications of the disclosed positioning systems and methods include the placement, removal, or manipulation of any and all equipment installed underwater for an oil or gas field, wind farm, or other structure, and the accompanying seabed. This includes, but is not limited to, an entire subsea tree system, subsea manifold, pipeline end termination (PLET), blowout preventer (BOP), pipelines and flow lines, anchors, risers, touch down points, suction piles, chains, slip joints, subsea processing systems, and the interconnectivity jumpers from the well to the surface delivery connection and surrounding seafloor. The described systems and methods increase the efficiency of installation and monitoring capability during installation, drilling, reservoir stimulation, construction, well intervention, riserless well intervention, well pressure testing, and during plug and abandonment operations. The described methods and devices utilize one or more nontouch subsea optical systems (including laser systems) for subsea well and subsea infrastructure installations, measurements and monitoring. Monitoring of undersea systems can include monitoring shifts in location over time.

In accordance with at least some embodiments of the present disclosure, the technology encompasses:

(1) A method for placing an object at a desired location in an underwater environment, comprising:
 determining a target location for an object, wherein the target location is in the underwater environment;
 operating a positioning system to project a visible target at the target location, wherein the positioning system is in the underwater environment.

(2) The method (1), further comprising: geolocating the positioning system, wherein the target location for the object is geolocated relative to the positioning system.

(3) The method of (2), wherein geolocating the positioning system includes operating a laser system to geolocate the positioning system.

(4) The method of (2) or (3), wherein the positioning system is geolocated by detecting a location of a monument, structure, or feature relative to the positioning system.

(5) The method of any of (2) to (4), wherein the positioning system is geolocated using underwater acoustic beacons with or without an Inertial Navigation Unit in conjunction with the positioning system.

(6) The method of any of (3) to (5), wherein a light source of the laser system produces light at a visible wavelength, and wherein the visible target is produced using light from the light source of the laser system.

(7) The method of any of (1) to (6), further comprising: a video system, wherein the video system provides a view of the visible target to an operator of at least one of a crane and an underwater vehicle, and wherein the at least one of the crane and the underwater vehicle is used to place the object at the desired installation location.

(8) The method of any of (1) to (7), further comprising: operating the positioning system to determine a location of the object relative to the target location.

(9) The method of any of (1) to (8), wherein the projected visible target at the target location is a virtual target projected onto a remote monitor in addition to a virtual object projected onto the same remote monitor.

(10) The method of (9), wherein the virtual target and object are contained in computer memory and are used by an autonomous system for accurate placement of the object.

(11) The method of any of (1) to (8), further comprising: moving the object towards the target location.

(12) The method of any of (1) to (8), further comprising:
 determining a position and orientation difference between the object and the target location;
 outputting the determined position and orientation difference to an operator of emplacement equipment being used to move the object towards the target location.

(13) The method of (12), wherein the operator of emplacement equipment is an automated system.

(14) The method of (12) or (13), further comprising outputting directional cues, approach velocities, proximity warnings, and collision alarms to an operator of emplacement equipment being used to move and orient the object at the target location.

(15) The method of (14), wherein the operator of emplacement equipment is an automated system.

(16) The method of any of (1) to (15), wherein the target location for the object is received as an absolute geographic location.

(17) The method of any of (1) to (16), wherein the visible target is at least a partial outline of the target location.

(18) The method of any of (1) to (17), wherein the visible target indicates a desired installation location of the object.

(19) The method of any of (1) to (18), wherein after the object is placed, the positioning system measures and reports the final touchdown speed, along with the final location and how much these vary from the ideal location.

(20) The method of any of (1) to (8), wherein after the object is placed, the positioning system captures and produces a final point cloud of seabed around the object for "as deployed" conditions to compare with future scans for scour or dredging.

(21) The method of any of (1) to (20), wherein a plurality of positioning systems are used wherein each positioning system has a known location, wherein each positioning system is operable to determine a location of an object relative to the positioning system, wherein each positioning system communicates location information to at least one other positioning system, and wherein one or more positioning systems project a visible target at the target location.

(22) The method of (21), wherein each positioning system communicates location information to at least one other positioning system and the object.

(23) The method of (21) or (22), further comprising: a plurality of objects, wherein a location of each of the object is determined by one or more of the positioning devices.

(24) The method of any of (1) to (23), wherein reference indicia are placed on the object to accurately determine its position and orientation with respect to the target location.

(25) The method of any of (1) to (24), wherein the positioning system is geolocated by detecting a location of a monument, structure, or feature relative to the positioning system.

(26) The method of (24) or (25) wherein at least one instance of the reference indicia is placed on the monument, structure, or feature.

In accordance with further aspects of the present disclosure, the technology encompasses:

(27) A system for facilitating the placement of objects in an underwater environment, comprising:
 a light source;
 an image projection device;
 memory, wherein the memory stores instructions for operating the light source and the image projection device, and wherein the memory further stores data regarding a target location;
 a processor, wherein the processor is operable to execute the instructions for operating the system, and wherein the instructions cause the light source and the image projection device to project a visible target within the target location.

(28) The system of (27), wherein the light source and the image projection device are operated to obtain point cloud data and to geolocate the system.

In accordance with still other aspects of the present disclosure, the technology encompasses:

(29) A system for facilitating the tracking of objects in an underwater environment, comprising:
a light source;
a device for collecting point cloud data;
memory, wherein the memory stores instructions for operating the light source and the device, and wherein the memory further stores data regarding a target location;
a processor, wherein the processor is operable to execute the instructions for operating the system, and wherein the instructions calculate the position and orientation information of the object to assist movement of the object to a target location.

(30) The system of (29), wherein the underwater object is one or more underwater vehicles and the system assists the vehicle with movement to a target location, automated docking, obstacle avoidance, valve operations, and valve observations.

(31) The system of (30), wherein the system provides zero velocity positional updates to the vehicle navigation system without the need for mechanical docking.

The foregoing discussion has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method for placing an object at a desired location in an underwater environment, comprising:
   determining a target location for placement of the object, wherein the target location is in the underwater environment;
   after determining the target location for placement of the object, operating a positioning system to project a visible target at the determined target location, wherein the positioning system is in the underwater environment, wherein the object is different than the positioning system, and wherein the visible target indicates the target location for placement of the object;
   providing a video system, wherein the video system provides a view of the visible target to an operator of emplacement equipment, and wherein the emplacement equipment is used to place the object at a desired installation location; and
   placing the object at the target location.

2. The method of claim 1, further comprising:
   geolocating the positioning system, wherein the target location for the object is geolocated relative to the positioning system.

3. The method of claim 2, wherein geolocating the positioning system includes operating a laser system to geolocate the positioning system.

4. The method of claim 2, wherein the positioning system is geolocated by detecting a location of a monument, structure, or feature relative to the positioning system.

5. The method of claim 2, wherein the positioning system is geolocated using underwater acoustic beacons with or without an Inertial Navigation Unit in conjunction with the positioning system.

6. The method of claim 3, wherein a light source of the laser system produces light at a visible wavelength, and wherein the visible target is produced using light from the light source of the laser system.

7. The method of claim 1, further comprising:
   operating the positioning system to determine a location of the object relative to the target location.

8. The method of claim 7, wherein the video system includes a user output device that displays a virtual target and a virtual object.

9. The method of claim 8, wherein the virtual target and the virtual object are contained in computer memory and are used by an autonomous system for accurate placement of the object.

10. The method of claim 7, further comprising:
    determining a position and orientation difference between the object and the target location; and
    outputting the determined position and orientation difference to the operator of the emplacement equipment being used to move the object towards the target location.

11. The method of claim 1, wherein the operator includes an automated system.

12. The method of claim 10, further comprising outputting directional cues, approach velocities, proximity warnings, or collision alarms to the operator of the emplacement equipment being used to move and orient the object at the target location.

13. The method of claim 12, wherein the operator of the emplacement equipment includes an automated system.

14. The method of claim 1, wherein the target location for the object is received as an absolute geographic location.

15. The method of claim 1, wherein the visible target is at least a partial outline of the target location.

16. The method of claim 7, wherein, after the object is placed, the positioning system reports a final touchdown speed for the object, a final location for the object, and how much the final location for the object varies from the target location.

17. The method of claim 7, wherein after the object is placed, the positioning system captures and produces a final point cloud of seabed around the object for "as deployed" conditions to compare with future scans for scour or dredging.

18. The method of claim 7, wherein a plurality of positioning systems are used, wherein each positioning system has a known location, wherein each positioning system is operable to determine a location of an object relative to the positioning system, and wherein one or more of the positioning systems project a visible target at the target location.

19. The method of claim 18, wherein each positioning system communicates location information to at least one other positioning system or the object.

20. The method of claim 18, further comprising: a plurality of objects, wherein a location of each of the objects is determined by one or more of the positioning systems.

21. The method of claim 7, wherein reference indicia are placed on the object to determine a position and orientation of the object with respect to the target location.

22. The method of claim 4, wherein at least one instance of reference indicia is placed on the monument, structure, or feature.

23. A system for facilitating the placement of objects in an underwater environment, comprising:
- a light source;
- an image projection device;
- a video system;
- memory, wherein the memory stores instructions for operating the system for facilitating the placement of objects in an underwater environmnet, including the light source, the image projection device, and the video system, and wherein the memory further stores data regarding a target location;
- emplacement equipment; and
- a processor, wherein the processor is operable to execute the instructions for operating the system for facilitating the placement of objects in an underwater environment, wherein the instructions cause the light source and the image projection device to project a visible target for placement of an object within or encompassing the target location, wherein the video system provides a view of the visible target projected by the image projection device to an operator of emplacement equipment, and wherein the object is placed at the target location by operation of the emplacement equipment.

24. The system of claim 23, wherein the light source and the image projection device are operated to obtain point cloud data that includes three-dimensional locations of points within the target location and to geolocate the system, and wherein the light source and the image projection device are operated to project the visible target.

25. A system for facilitating the tracking of an object in an underwater environment, comprising:
- a light source;
- a device for collecting point cloud data;
- a video system;
- memory, wherein the memory stores instructions for operating the system for facilitating the tracking of an object in an underwater environment, including the light source, the device for collecting point cloud data, and the video system, and wherein the memory further stores data regarding a target location;
- emplacement equipment; and
- a processor, wherein the processor is operable to execute the instructions for operating the system for facilitating the tracking of an object in an underwater environment, wherein the video system provides a view of a visible target projected at the target location to an operator, wherein the instructions calculate position and orientation information of an object to assist movement of the object to the target location, and wherein the object is placed at the target location by the emplacement equipment using the calculated position and orientation information.

26. The system of claim 25, wherein the object is an underwater vehicle and the system assists the vehicle with movement to a target location, and at least one of automated docking, obstacle avoidance, operating a valve, or observing a valve.

27. The system of claim 26, wherein the system provides positional updates to a vehicle navigation system without a need for mechanical docking.

28. The method of claim 1, wherein the object is at least one of a wellhead, manifold, riser, anchor, pipeline end termination, blow out preventer, pump, suction pile, chain, slip joint, subsea processing system, interconnectivity jumper, touch down point, acoustic beacon, acoustic transponder, monument, mud mat, jumper, remotely operated vehicle, or autonomous underwater vehicle.

29. The method of claim 1, wherein the emplacement equipment includes at least one of a crane or an underwater vehicle.

30. The system of claim 23, wherein the object is at least one of a wellhead, manifold, riser, anchor, pipeline end termination, blow out preventer, pump, suction pile, chain, slip joint, subsea processing system, interconnectivity jumper, touch down point, acoustic beacon, acoustic transponder, monument, mud mat, jumper, remotely operated vehicle, or autonomous underwater vehicle.

31. The system of claim 23, wherein the emplacement equipment includes at least one of a crane or an underwater vehicle.

32. The system of claim 25, wherein the object is at least one of a wellhead, manifold, riser, anchor, pipeline end termination, blow out preventer, pump, suction pile, chain, slip joint, subsea processing system, interconnectivity jumper, touch down point, acoustic beacon, acoustic transponder, monument, mud mat, jumper, remotely operated vehicle, or autonomous underwater vehicle.

33. The method of claim 1, wherein the operator of the emplacement equipment is a diver.

* * * * *